(12) United States Patent
Zhu et al.

(10) Patent No.: US 11,777,230 B2
(45) Date of Patent: Oct. 3, 2023

(54) ANTENNA DEVICE, SYSTEM, AND TRANSMISSION/RECEPTION METHOD

(71) Applicant: KABUSHIKI KAISHA TOSHIBA, Tokyo (JP)

(72) Inventors: Xu Zhu, Kawasaki Kanagawa (JP); Hiroki Mori, Kawasaki Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 93 days.

(21) Appl. No.: 17/469,662

(22) Filed: Sep. 8, 2021

(65) Prior Publication Data

US 2022/0190488 A1 Jun. 16, 2022

(30) Foreign Application Priority Data

Dec. 10, 2020 (JP) ................. 2020-204923

(51) Int. Cl.
*H01Q 21/26* (2006.01)
*H01Q 3/10* (2006.01)
*G01S 13/90* (2006.01)

(52) U.S. Cl.
CPC ......... *H01Q 21/26* (2013.01); *G01S 13/9082* (2019.05); *H01Q 3/10* (2013.01)

(58) Field of Classification Search
CPC . H01Q 21/26; H01Q 3/10; H01Q 3/04; G01S 13/9082; G01S 13/867; G01S 13/887
See application file for complete search history.

(56) References Cited

U.S. PATENT DOCUMENTS

| | | | |
|---|---|---|---|
| 9,715,012 B2 | 7/2017 | Fernandes et al. | |
| 10,330,785 B2 | 6/2019 | Ahmed | |
| 2006/0158369 A1* | 7/2006 | Shinoda | H01Q 3/06 342/146 |
| 2021/0025967 A1* | 1/2021 | Corbett | G01S 13/937 |
| 2021/0325528 A1* | 10/2021 | Chen | G01S 13/89 |

* cited by examiner

*Primary Examiner* — Timothy A Brainard
*Assistant Examiner* — Juliana Cross
(74) *Attorney, Agent, or Firm* — Finnegan, Henderson, Farabow, Garrett & Dunner, LLP

(57) ABSTRACT

According to one embodiment, an antenna device comprises an antenna panel including a first transmission antenna, a first reception antenna, and a second reception antenna, and a rotation device configured to rotate the antenna panel. A first radio wave is irradiated from the first transmission antenna when a rotation angle of the antenna panel is a first angle and a reflected radio wave of the first radio wave is received by the first reception antenna and the second reception antenna. A second radio wave is irradiated from the first transmission antenna when the rotation angle is a second angle and a reflected radio wave of the second radio wave is received by the first reception antenna and the second reception antenna.

32 Claims, 22 Drawing Sheets

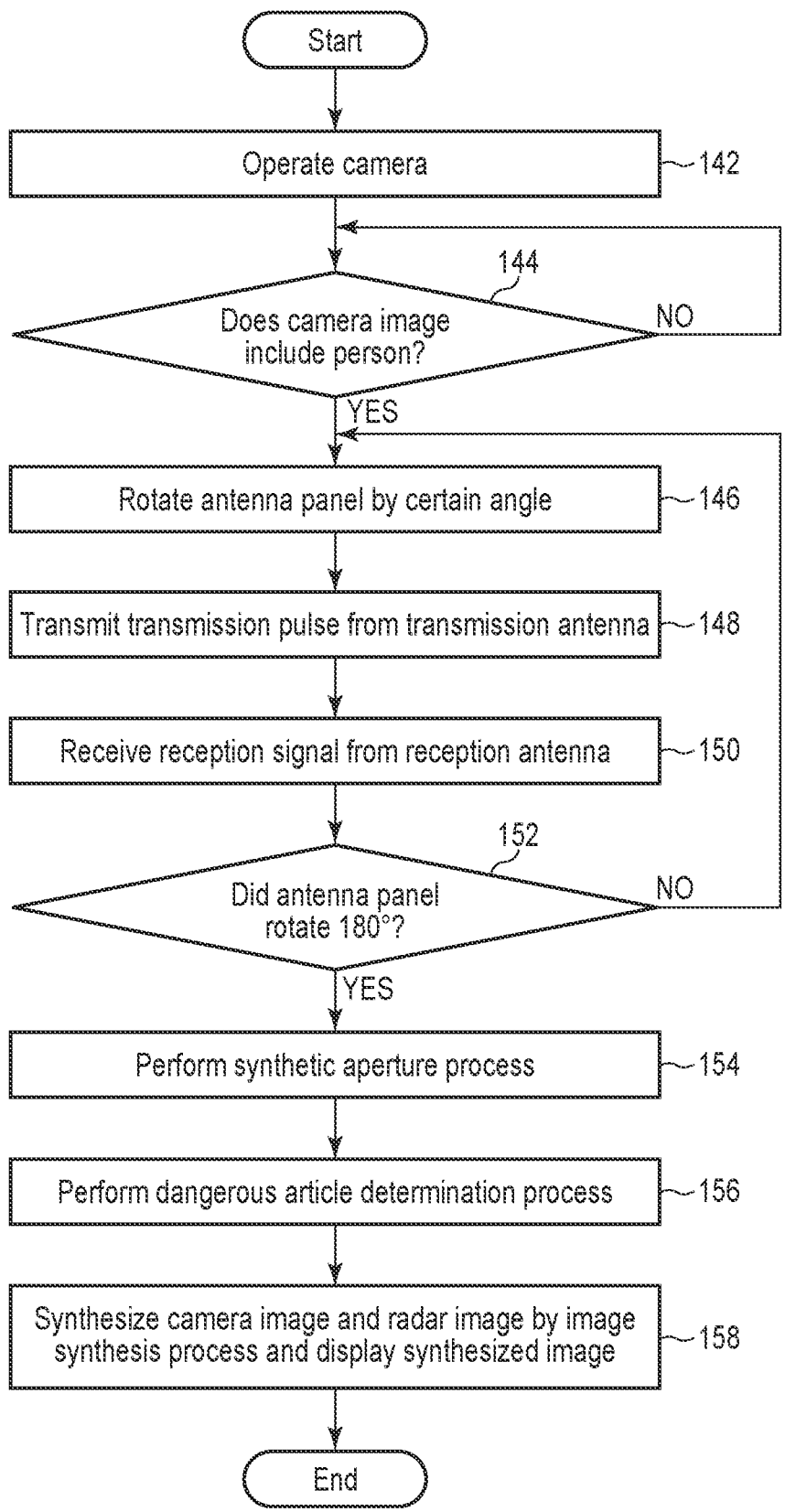
F I G. 10

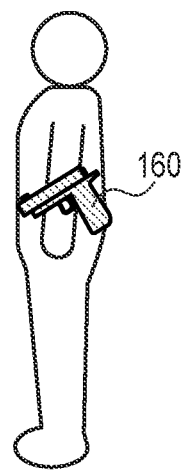 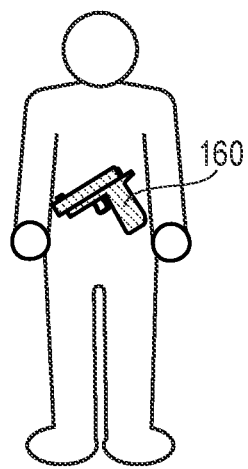
F I G. 11A     F I G. 11B

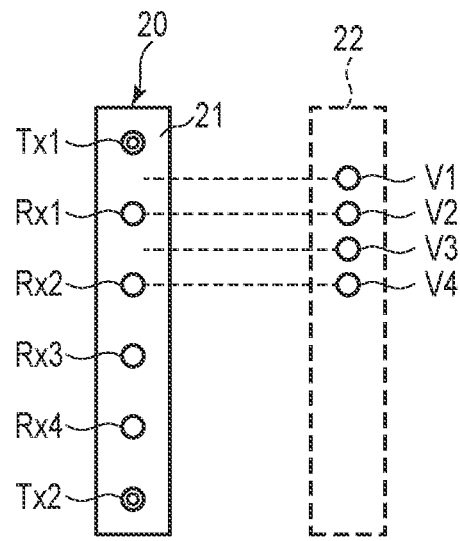
F I G. 15
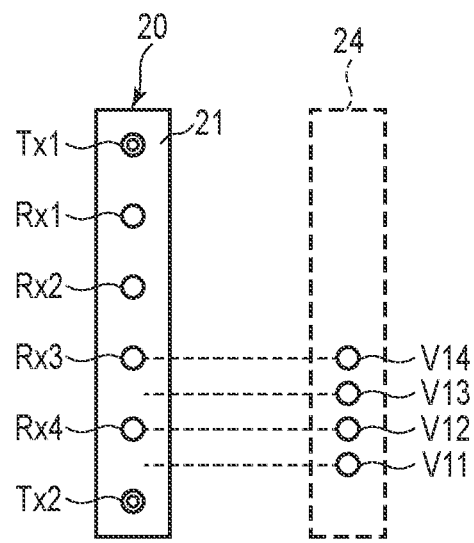
F I G. 16

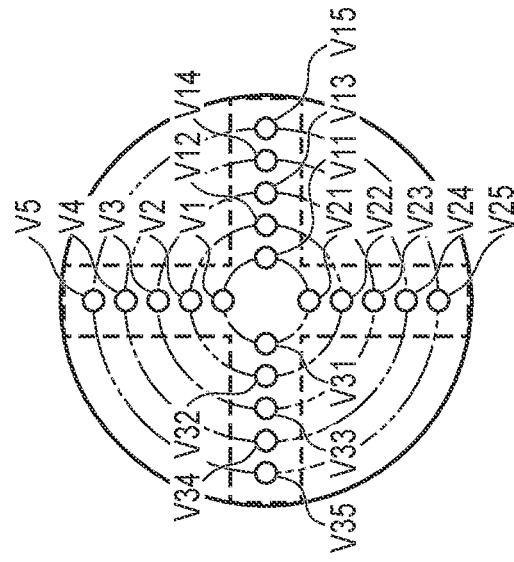
F I G. 23B
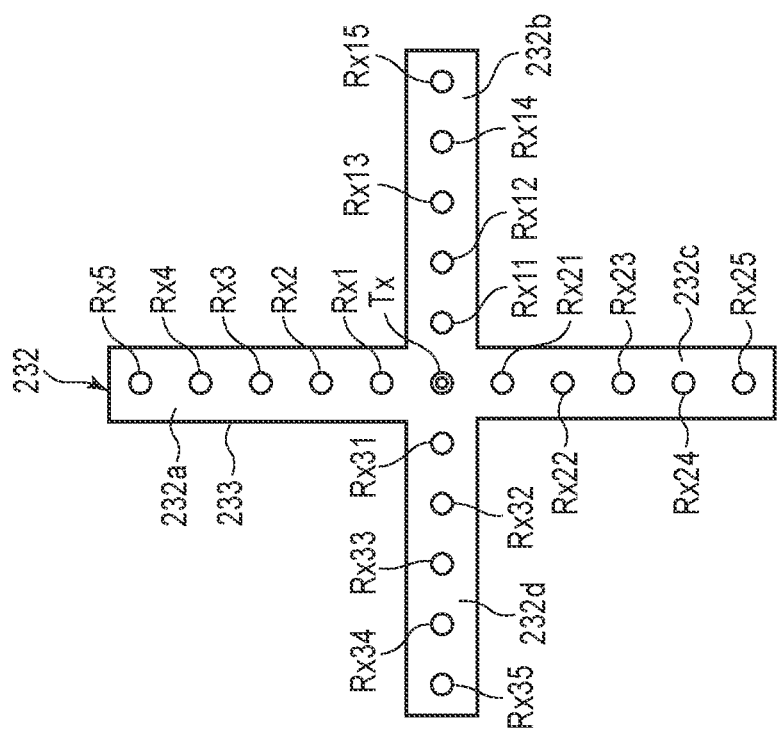
F I G. 23A

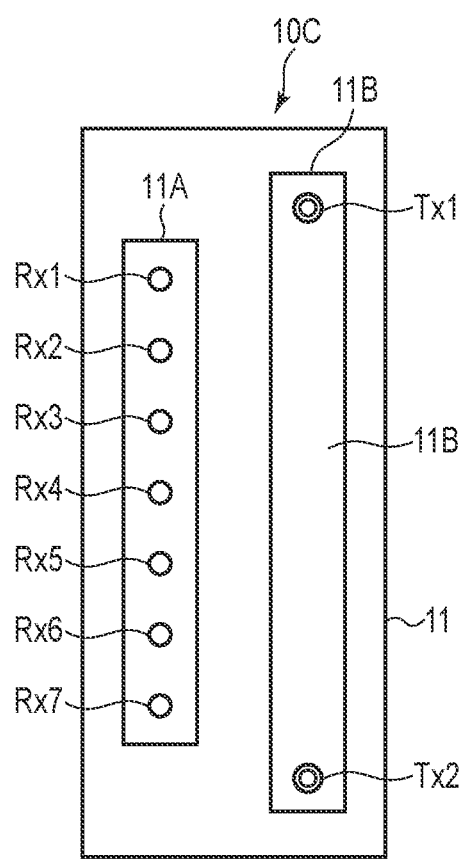
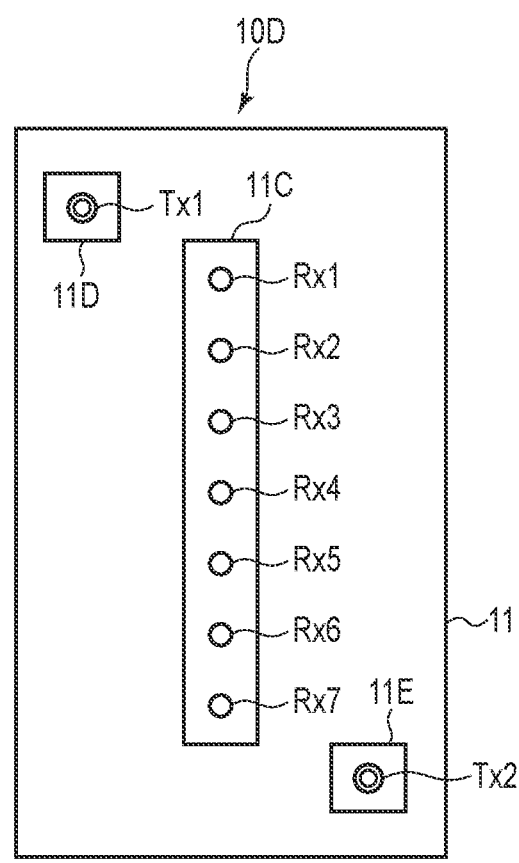
F I G. 25A  F I G. 25B

ANTENNA DEVICE, SYSTEM, AND TRANSMISSION/RECEPTION METHOD

CROSS-REFERENCE TO RELATED APPLICATIONS

This application is based upon and claims the benefit of priority from Japanese Patent Application No. 2020-204923, filed Dec. 10, 2020, the entire contents of which are incorporated herein by reference.

FIELD

Embodiments described herein relate generally to an antenna device, a system, and a transmission/reception method.

BACKGROUND

An inspection device is known that inspects belongings of a person to be inspected (hereinafter, referred to as a subject) using radio waves. Such an inspection device irradiates radio waves toward a large number of points of the subject, receives reflected waves from the subject, and performs imaging of the belongings based on the amplitude of a reception signal.

In order to perform high-definition imaging, it is necessary to irradiate radio waves to a very large number of points of the subject, and thus the inspection device includes an array antenna.

The array antenna includes a one-dimensional array antenna (hereinafter, referred to as a linear array antenna) and a two-dimensional array antenna (hereinafter, referred to as an area or a planar array antenna).

Since the inspection device including the area array antenna performs irradiation and reception by switching a large number of antennas by an electronic switch, the inspection device increases in size and cost. Furthermore, since the inspection device irradiates radio waves from a large number of antennas, time required for one inspection is long, and it is not possible to perform a walk-through inspection in which a walking subject is inspected without stopping.

An inspection device including a linear array antenna mechanically moves the linear array antenna in a direction intersecting an array direction of the antennas and irradiates radio waves to a whole body of a subject. The inspection device moves the linear array antenna in one direction to scan the subject, and then moves the linear array antenna in the opposite direction to return the linear array antenna to the initial position. When radio waves are irradiated and received during the return movement, imaging accuracy deteriorates due to the influence of backlash caused by the change in the movement direction. For this reason, the radio wave cannot be irradiated and received during the return movement, and the inspection device also has a long time required for one inspection and cannot perform the walk-through inspection.

Furthermore, when performing imaging using an array antenna, the distance between antennas is required to be set to half wavelength of the radio wave, and thus the array antenna requires a large number of antennas. Therefore, the array antenna is increased in size, and it is difficult to reduce the size of the inspection device.

BRIEF DESCRIPTION OF THE DRAWINGS

FIG. 10 is a flowchart illustrating an example of a process of a CPU of the inspection device according to the first embodiment.

FIGS. 11A and 11B illustrate display examples of a synthesized image according to the first embodiment.

FIG. 15 is a plan view of an example of an antenna panel according to a second modification.

FIG. 16 is a plan view of another example of an antenna panel according to the second modification.

FIGS. 23A and 23B are plan views of an example of an antenna panel according to a sixth modification.

FIGS. 25A and 25B are plan views of an example of an antenna panel according to an eighth modification.

DETAILED DESCRIPTION

Figure 1:
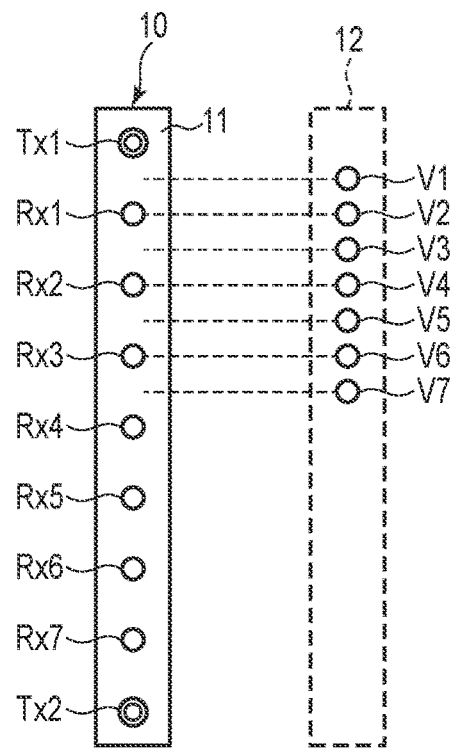
FIG. 1 is a plan view of an example of an antenna panel according to a first embodiment.

Various embodiments will be described hereinafter with reference to the accompanying drawings.

The disclosure is merely an example and is not limited by contents described in the embodiments described below. Modification which is easily conceivable by a person of ordinary skill in the art comes within the scope of the disclosure as a matter of course. In order to make the description clearer, the sizes, shapes, and the like of the respective parts may be changed and illustrated schematically in the drawings as compared with those in an accurate representation. Constituent elements corresponding to each other in a plurality of drawings are denoted by like reference numerals and their detailed descriptions may be omitted unless necessary.

In general, according to one embodiment, an antenna device comprises: an antenna panel including a first transmission antenna, a first reception antenna, and a second reception antenna; and a rotation device configured to rotate the antenna panel around a point on the antenna panel as a rotation center. A first radio wave is irradiated from the first transmission antenna when a rotation angle of the antenna panel is a first angle, and a reflected radio wave of the first radio wave is received by the first reception antenna and the second reception antenna. A second radio wave is irradiated from the first transmission antenna when a rotation angle of the antenna panel is a second angle different from the first angle, and a reflected radio wave of the second radio wave is received by the first reception antenna and the second reception antenna.

First Embodiment

FIG. 1 is a plan view of an example of an antenna panel 10 according to a first embodiment.

The antenna panel 10 includes a linear array antenna disposed on a substrate 11. Although FIG. 1 illustrates the linear substrate 11, the shape of the substrate 11 does not necessarily correspond to the shape of the array antenna. A circuit module (not illustrated) may be disposed on the substrate 11. The substrate 11 on which the array antenna and the circuit module are disposed may have a rectangular shape. The circuit module includes an integrated circuit of a transmission circuit and a reception circuit. The array antenna includes at least one transmission antenna (two transmission antennas Tx1 and Tx2 in the first embodiment) and at least one reception antenna (seven reception antennas Rx1, Rx2, Rx3, Rx4, Rx5, Rx6, and Rx7 in the first embodiment). For example, the array antenna may include a transmission antenna and at least one reception antenna. The array antenna may include at least one transmission antenna and a reception antenna. The array antenna may include a transmission antenna and a reception antenna.

The first transmission antenna Tx1, the reception antennas Rx1 to Rx7, and the transmission antenna Tx2 are disposed with an equal distance therebetween along a line in this order. That is, the transmission antennas Tx1 and Tx2 are disposed at the outer sides of an array of the reception antennas Rx1 to Rx7. A distance between two adjacent antennas among the first transmission antenna Tx1, the reception antenna Rx1 to Rx7, and the transmission antenna Tx2 is a length of a wavelength of a radio wave to be irradiated and received. For example, the radio wave used in the embodiment includes a radio wave having a wavelength of 1 millimeter to 30 millimeters. Note that a radio wave having a wavelength of 1 mm to 10 mm is also referred to as a millimeter wave, and a radio wave having a wavelength of 10 mm to 100 mm is also referred to as a microwave.

The first transmission antenna Tx1 or Tx2 irradiates a pulsed radio wave (referred to as a transmission pulse). The transmission pulse is reflected by an object present in the radio wave irradiation area. The reception antennas Rx1 to Rx7 receive reflected waves from an object. The reception signals of the reception antennas Rx1 to Rx7 are subjected to a synthetic aperture process. As a result, the reception signals of the reception antennas Rx1 to Rx7 are equivalent to the reception signals of the virtual antennas located at the midpoints of the transmission antennas Tx1 or Tx2 and the reception antennas Rx1 to Rx7. These virtual antennas configure a virtual array antenna.

In order to form the virtual array antenna, first, the first transmission antenna Tx1 irradiates a transmission pulse. The reception antennas Rx1 to Rx7 receive the reflected radio wave of the transmission pulse irradiated from the first transmission antenna Tx1. When the reception signals of the reception antennas Rx1 to Rx7 are subjected to the synthetic aperture process, a virtual array antenna 12 including virtual antennas v1 to v7 located at the midpoints of the first transmission antenna Tx1 and the reception antennas Rx1 to Rx7 is formed as illustrated in FIG. 1.

For example, the virtual antenna v1 located at the midpoint between the first transmission antenna Tx1 and the reception antenna Rx1 is formed by performing the synthetic aperture process on the reception signal output from the reception antenna Rx1 that receives the reflected wave of the transmission pulse irradiated from the first transmission antenna Tx1. The virtual antenna v7 located at the midpoint between the first transmission antenna Tx1 and the reception antenna Rx7, that is, the midpoint between the reception antenna Rx3 and the reception antenna Rx4 is formed by performing the synthetic aperture process on the reception signal output from the reception antenna Rx7 that receives the reflected wave of the transmission pulse irradiated from the first transmission antenna Tx1. The other virtual antennas v2 to v6 are similarly formed.

The distance between antennas of the virtual array antenna 12 is half the distance between antennas of the array antenna. That is, the distance between two adjacent virtual antennas among the virtual antennas v1 to v7 is a length of half wavelength of the radio wave.

Figure 2:
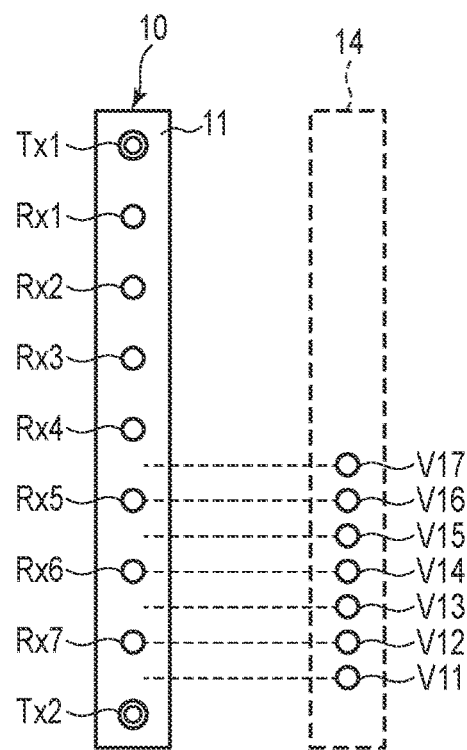
FIG. 2 is a plan view of another example of an antenna panel according to a first embodiment.

When the synthetic aperture process on the reception signal of the transmission pulse of the first transmission antenna Tx1 ends, the transmission antenna Tx2 irradiates the transmission pulse. The reception antennas Rx1 to Rx7 receive the reflected radio wave of the transmission pulse irradiated from the transmission antenna Tx2. When the reception signals of the reception antennas Rx1 to Rx7 are subjected to the synthetic aperture process, a virtual array antenna 14 including virtual antennas v17 to v11 located at the midpoints of the transmission antenna Tx2 and the reception antennas Rx1 to Rx7 is formed as illustrated in FIG. 2.

For example, the virtual antenna v17 located at the midpoint between the transmission antenna Tx2 and the reception antenna Rx1, that is, the midpoint between the reception antenna Rx4 and the reception antenna Rx5 is formed by performing the synthetic aperture process on the reception signal output from the reception antenna Rx1 that receives the reflected wave of the transmission pulse irradiated from the transmission antenna Tx2. The virtual antenna v11 located at the midpoint between the transmission antenna Tx2 and the reception antenna Rx7 is formed by performing the synthetic aperture process on the reception signal output from the reception antenna Rx7 that receives the reflected wave of the transmission pulse irradiated from the transmission antenna Tx2. The other virtual antennas v12 to v16 are similarly formed.

The distance between two adjacent virtual antennas among the virtual antennas v11 to v17 is also a length of half wavelength of the radio wave.

Figure 3:
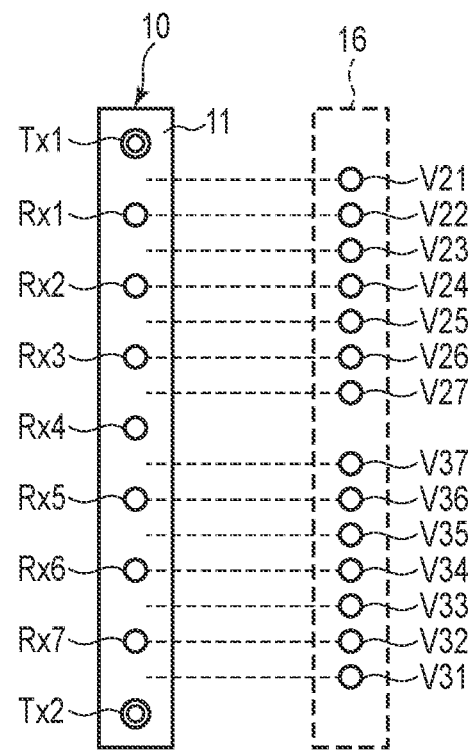
FIG. 3 is a plan view of a further example of an antenna panel according to a first embodiment.

FIG. 3 illustrates a virtual array antenna 16 formed when the pairs of the first transmission antenna Tx1 and the respective reception antennas Rx1 to Rx7 irradiate and receive transmission pulses and the pairs of the transmission antenna Tx2 and the respective reception antennas Rx1 to Rx7 irradiate and receive transmission pulses.

The virtual array antenna 16 includes the virtual antennas v21 to v27 (equivalent to the virtual antennas v1 to v7 in FIG. 1) obtained by performing the synthetic aperture process on the reception signals of the reception antennas Rx1 to Rx7 that receive the transmission pulses from the first transmission antenna Tx1 and the virtual antennas v37 to v31 (equivalent to the virtual antennas v17 to v11 in FIG. 2) obtained by performing the synthetic aperture process on the reception signals of the reception antennas Rx1 to Rx7 that receive the transmission pulses from the transmission antenna Tx2.

The distance between the virtual antenna v27 and the virtual antenna v37 is a length of a wavelength of the radio wave.

The virtual array antenna 16 illustrated in FIG. 3 is a one-dimensional array antenna. In order to image an inspection target in a two-dimensional region, a reception signal of a two-dimensional array antenna is required. Therefore, in the conventional art, by moving the one-dimensional array antenna in one direction, a signal equivalent to a reception signal of a two-dimensional array antenna is obtained from the one-dimensional array antenna. This method has a problem that imaging accuracy deteriorates when the imaging time is shortened by irradiating radio waves during the return movement due to the influence of backlash. Therefore, in the embodiment, by rotating the one-dimensional array antenna, a signal equivalent to the reception signal of the two-dimensional array antenna is obtained from the one-dimensional array antenna.

Figure 4:
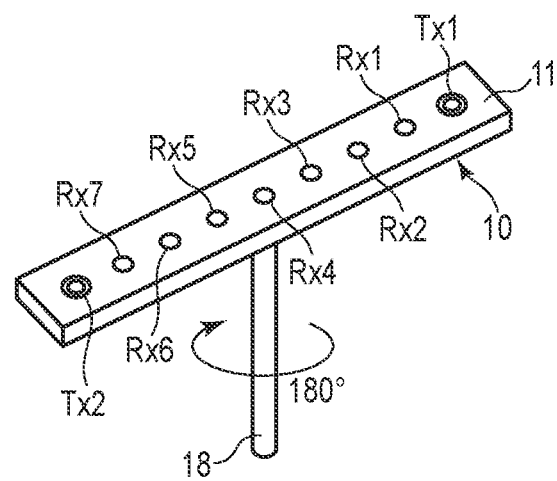
FIG. 4 illustrates an example of rotation of the antenna panel according to the first embodiment.

FIG. 4 is a perspective view of an example of the antenna panel 10 of the first embodiment. The transmission antennas Tx1 and Tx2 and the reception antennas Rx1 to Rx7 are disposed on the surface of the substrate 11. A rotation shaft 18 orthogonal to the substrate 11 is attached to the back face of the substrate 11. The rotation shaft 18 is attached to a point on the array antenna on the substrate 11. For example, the rotation shaft 18 is attached to the center of the array antenna, here, the position of the fourth reception antenna Rx4. The distance from the rotation shaft 18 to the first transmission antenna Tx1 or the second transmission antenna Tx2 is longer than any of the distances from the rotation shaft 18 to all the respective reception antennas Rx1 to Rx7 included in the antenna panel. The rotation shaft 18 is connected to a motor (not illustrated). The motor intermittently rotates the antenna panel 10 through the rotation shaft 18, for example, on a 5 degrees basis. That is, the antenna panel 10 rotates on the panel surface around the midpoint in the length direction of the array antenna. The angle of the intermittent rotation is not limited to 5 degrees and can be freely set.

When the antenna panel 10 is at the initial position (the rotation angle is 0 degrees), a transmission pulse is irradiated from the first transmission antenna Tx1, and the reception signals of the reception antennas Rx1 to Rx7 are subjected to the synthetic aperture process, so that reception signals of the virtual antennas v21 to v27 forming half of the virtual array antenna 16 are obtained. Next, the transmission pulse is irradiated from the transmission antenna Tx2, and the reception signals of the reception antennas Rx1 to Rx7 are subjected to the synthetic aperture process, so that the reception signals of the virtual antennas v37 to v31 forming the remaining half of the virtual array antenna 16 are obtained.

When the antenna panel 10 starts to rotate and rotates by 5 degrees, the rotation of the antenna panel 10 is temporarily stopped. Also at this time, the transmission pulses are sequentially irradiated from the first transmission antenna Tx1 and the transmission antenna Tx2, and the reception signals of the reception antennas Rx1 to Rx7 are subjected to the synthetic aperture process, whereby the reception signals of the virtual antennas v21 to v27 and v37 to v31 forming the virtual array antenna 16 are obtained.

Hereinafter, similarly, every time the motor rotates the antenna panel 10 by 5 degrees, the rotation of the antenna panel 10 is temporarily stopped, the transmission pulses are sequentially irradiated from the first transmission antenna Tx1 and the transmission antenna Tx2, and the reception signals of the reception antennas Rx1 to Rx7 are subjected to the synthetic aperture process, whereby the reception signals of the virtual antennas v21 to v27 and v37 to v31 forming the virtual array antenna 16 are obtained.

As described above, the antenna panel 10 including the seven reception antennas Rx1 to Rx7 disposed with a distance of a wavelength therebetween rotates by 180 degrees around the midpoint as the rotation center in the length direction of the array antenna on the substrate 11. Every time the antenna panel rotates by a certain angle, the transmission pulse is irradiated and received and the synthetic aperture process is performed, so that a two-dimensional virtual array antenna having a circular synthetic aperture is formed.

Figure 5:
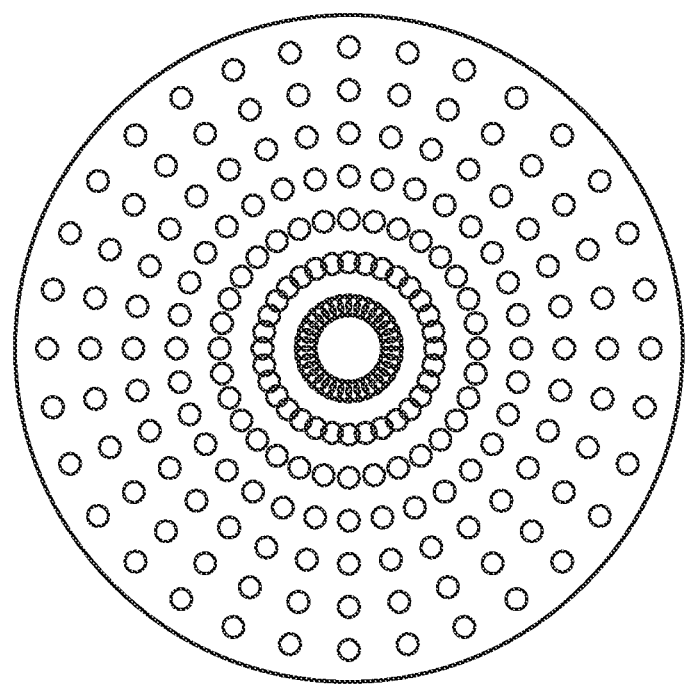
FIG. 5 illustrates an example of a two-dimensional virtual array antenna according to the first embodiment.

FIG. 5 illustrates an example of a two-dimensional virtual array antenna. The two-dimensional virtual array antenna illustrated in FIG. 5 includes virtual antennas disposed with a regular distance therebetween on the entire circumference of 360 degrees of seven concentric circles with a distance of half wavelength therebetween. The circumferential distance between the virtual antennas depends on a rotation angle of the intermittent rotation of the antenna panel 10 by the motor. It is possible to image the irradiation area of the transmission pulse by transmitting and receiving the transmission pulse using the virtual antenna array as illustrated in FIG. 5.

Figure 6:
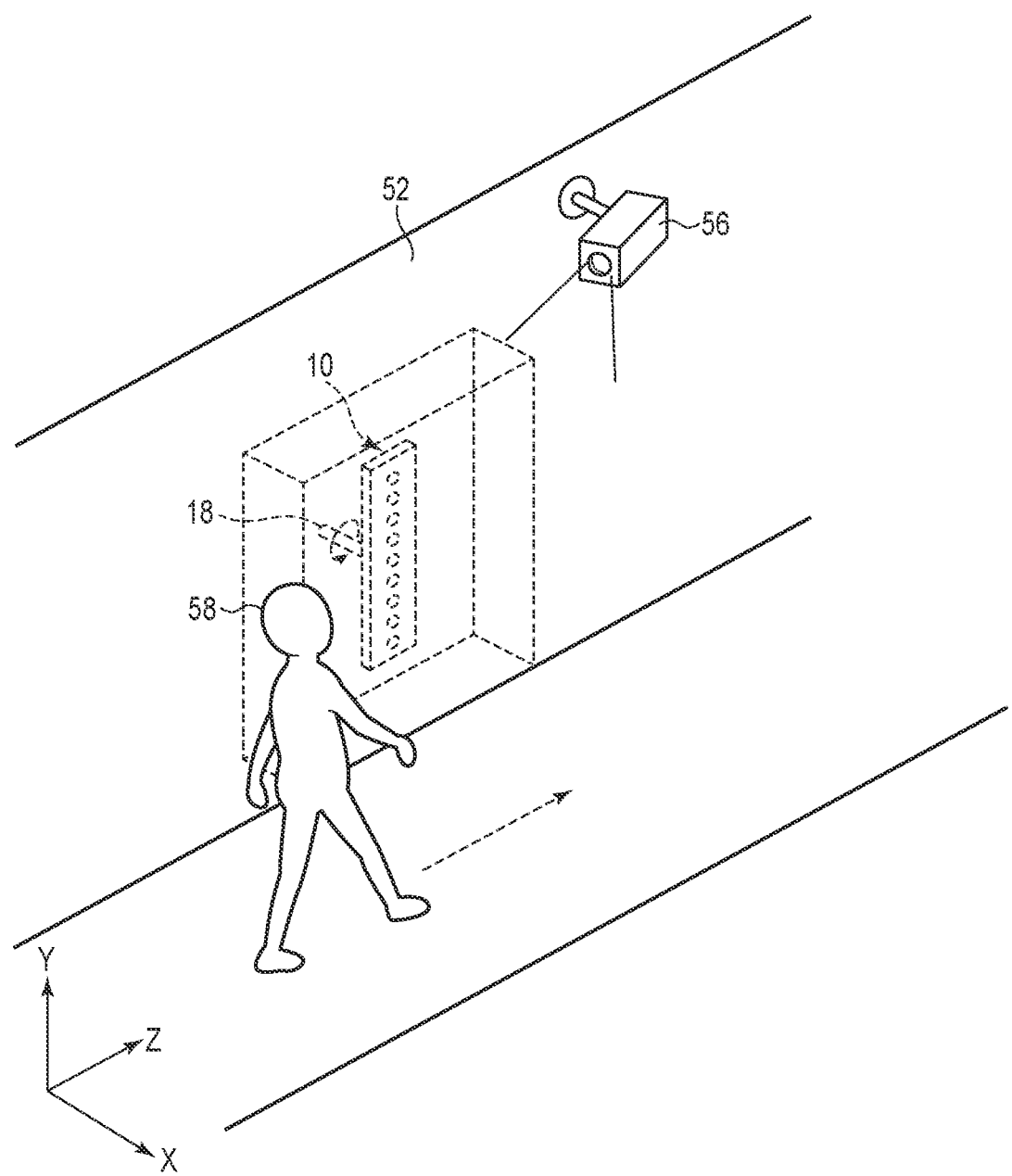
FIG. 6 illustrates a first example of arrangement of the antenna panel in a side according to the first embodiment.
Figure 7:
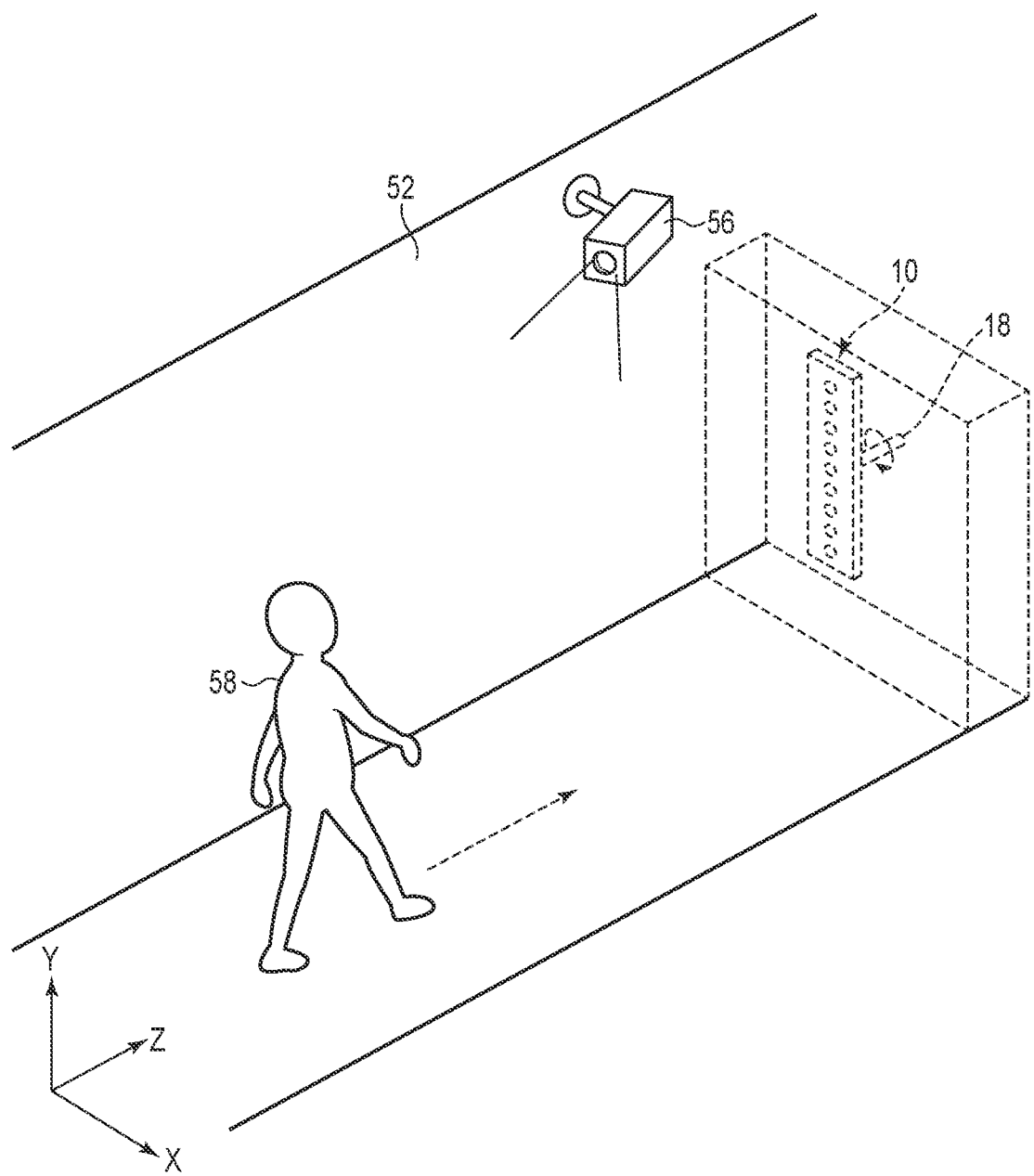
FIG. 7 illustrates a first example of arrangement of the antenna panel in a front according to the first embodiment.
Figure 8:
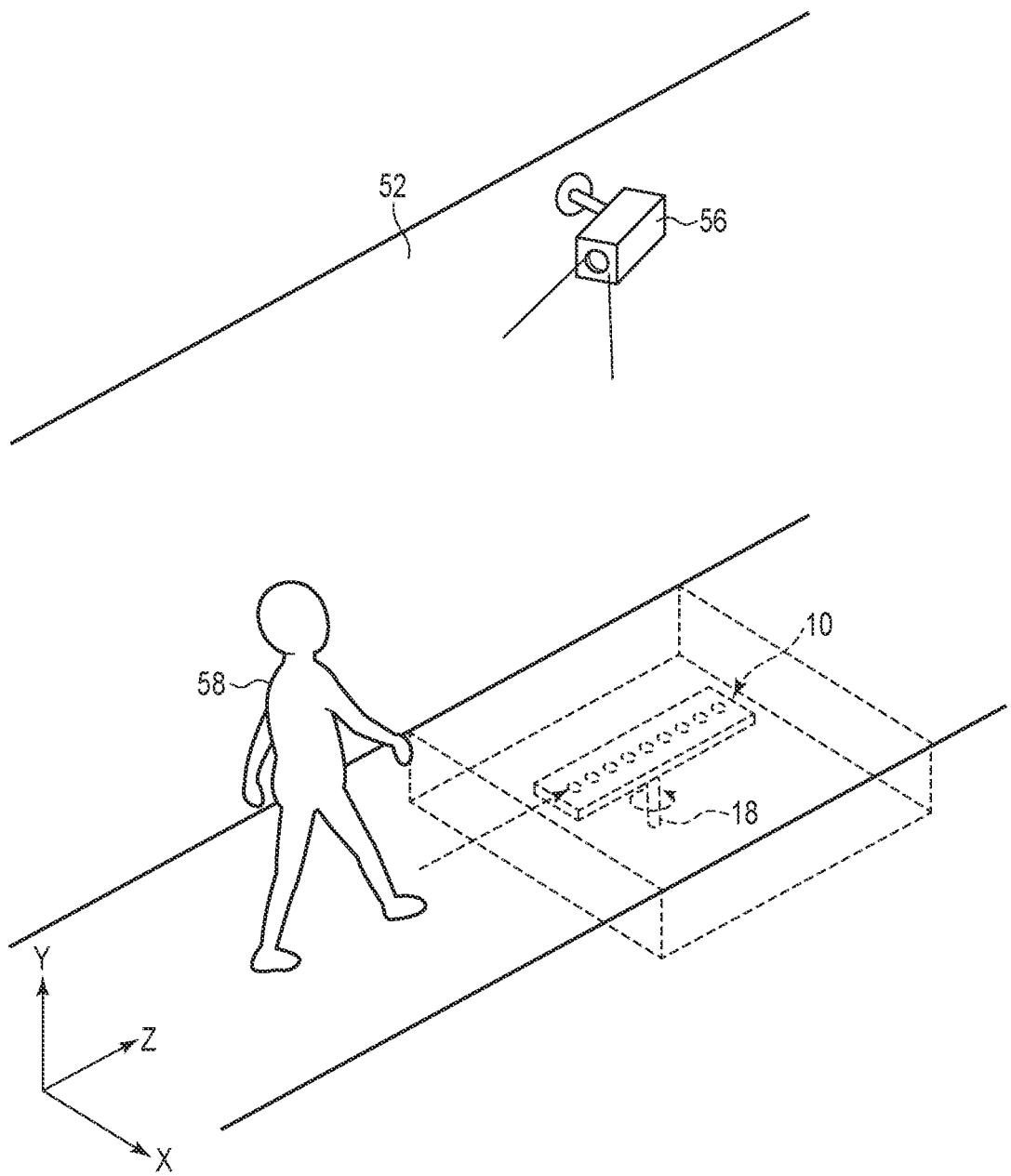
FIG. 8 illustrates a first example of arrangement of the antenna panel in a floor according to the first embodiment.

FIGS. 6, 7, and 8 illustrate arrangement examples of the antenna panel 10. The inspection device determines, for example, whether the subject has a dangerous article in secret. An example of the inspection device is a screening system that detects a person who possesses a dangerous article such as a handgun or an explosive in a facility where an unspecified large number of people gather, such as an airport, a station, a shopping mall, a concert hall, or an exhibition hall. Since a person walks, the person may not stay in the inspection area for a long time, and it is desired to accurately detect a dangerous article in a short time, which is possessed by a subject who is walking.

When the transmission pulse is irradiated to the subject, the radio wave is reflected by an object present on the propagation path of the radio wave. By measuring the reflection intensity of the radio wave reflected at a certain distance, it is possible to determine whether the object present at the distance is a human body or a dangerous article such as a handgun or an explosive.

FIG. 6 illustrates an arrangement example of the antenna panel 10 in the inspection device that inspects the subject from the side. A left-right direction of a subject 58 is an X-axis direction, a vertical direction of the subject 58 is a Y-axis direction, and a walking direction of the subject 58 is a Z-axis direction. When the subject 58 passes through the inspection area, it is determined whether the subject 58 possesses a dangerous article.

An area through which an unspecified number of people pass is defined as an inspection area. The antenna panel 10 and a motor (not illustrated) are disposed on a side wall 52 of the inspection area. Alternatively, a gate for inspection may be provided on a side face of the inspection area, and the antenna panel 10 and the motor may be disposed at the gate. Furthermore, the antenna panel 10 and the motor may be disposed not only on one side face of the inspection area but also on both side faces of the inspection area.

The substrate face of the antenna panel 10 is located on the Y-Z plane. The direction of the rotation shaft 18 of the antenna panel 10 is the X-axis direction. Therefore, the antenna panel 10 rotates on the Y-Z plane, that is, the side face of the subject 58. With the reception signal of the two-dimensional virtual array antenna formed by rotating the antenna panel 10 on the side face of the subject 58, two-dimensional imaging of the reflective object on the Y-Z plane located at a certain distance in the X-axis direction or three-dimensional imaging by combining a plurality of two-dimensional images of the reflective object on the Y-Z plane located at a plurality of distances in the X-axis direction can be performed.

When there is a high possibility that the subject 58 is not constantly present in the inspection area, the antenna panel 10 does not need to rotate constantly. In such a case, the antenna panel 10 may be rotated only at the timing when the subject 58 is present in the inspection area, and the transmission pulse may be irradiated and received. Therefore, a sensor that detects the entry of the subject 58 into the inspection area may be provided. Examples of the sensor include an ultrasonic sensor and an infrared sensor. Instead of the sensor, a camera may be used. That is, a camera 56 may be provided on the wall 52 so as to capture an image of the inspection area, and the entry of the subject 58 into the inspection area may be detected by performing the image process on the captured image to detect the subject 58.

FIG. 7 illustrates an arrangement example of the antenna panel 10 in the inspection device that inspects the subject 58 from the front. The antenna panel 10 and the motor are disposed in front of the inspection area. Alternatively, a gate for inspection may be provided in front of the inspection area, and the antenna panel 10 and the motor may be disposed at the gate. The antenna panel 10 and the motor may be disposed not only in front of the inspection area but also in front of and behind the inspection area.

The substrate face of the antenna panel 10 is located on the X-Y plane. The direction of the rotation shaft 18 of the antenna panel 10 is the Z-axis direction. Therefore, the antenna panel 10 rotates in the X-Y plane, that is, the front face of the subject 58. With the reception signal of the two-dimensional virtual array antenna formed by rotating the antenna panel 10 on the front face of the subject 58, two-dimensional imaging of the reflective object on the X-Y plane located at a certain distance in the Z-axis direction, or three-dimensional imaging by combining a plurality of two-dimensional images of the reflective object on the X-Y plane located at a plurality of distances in the Z-axis direction can be performed.

FIG. 8 illustrates an arrangement example of the antenna panel 10 in the inspection device that inspects the subject 58 from below. This inspection device detects a dangerous article hidden in the shoe by the subject 58. The antenna panel 10 and the motor are disposed under the floor of the inspection area.

The substrate face of the antenna panel 10 is located on the X-Z plane. The direction of the rotation shaft 18 of the antenna panel 10 is the Y-axis direction. Therefore, the antenna panel 10 rotates on the X-Z plane, that is, the walking surface of the subject 58. With the reception signal of the two-dimensional virtual array antenna formed by rotating the antenna panel 10 on the walking surface of the subject 58, two-dimensional imaging of the reflective object on the X-Z plane located at a certain distance in the Y-axis direction, or three-dimensional imaging by combining a plurality of two-dimensional images of the reflective object on the X-Z plane located at a plurality of distances in the Y-axis direction can be performed.

Figure 9:
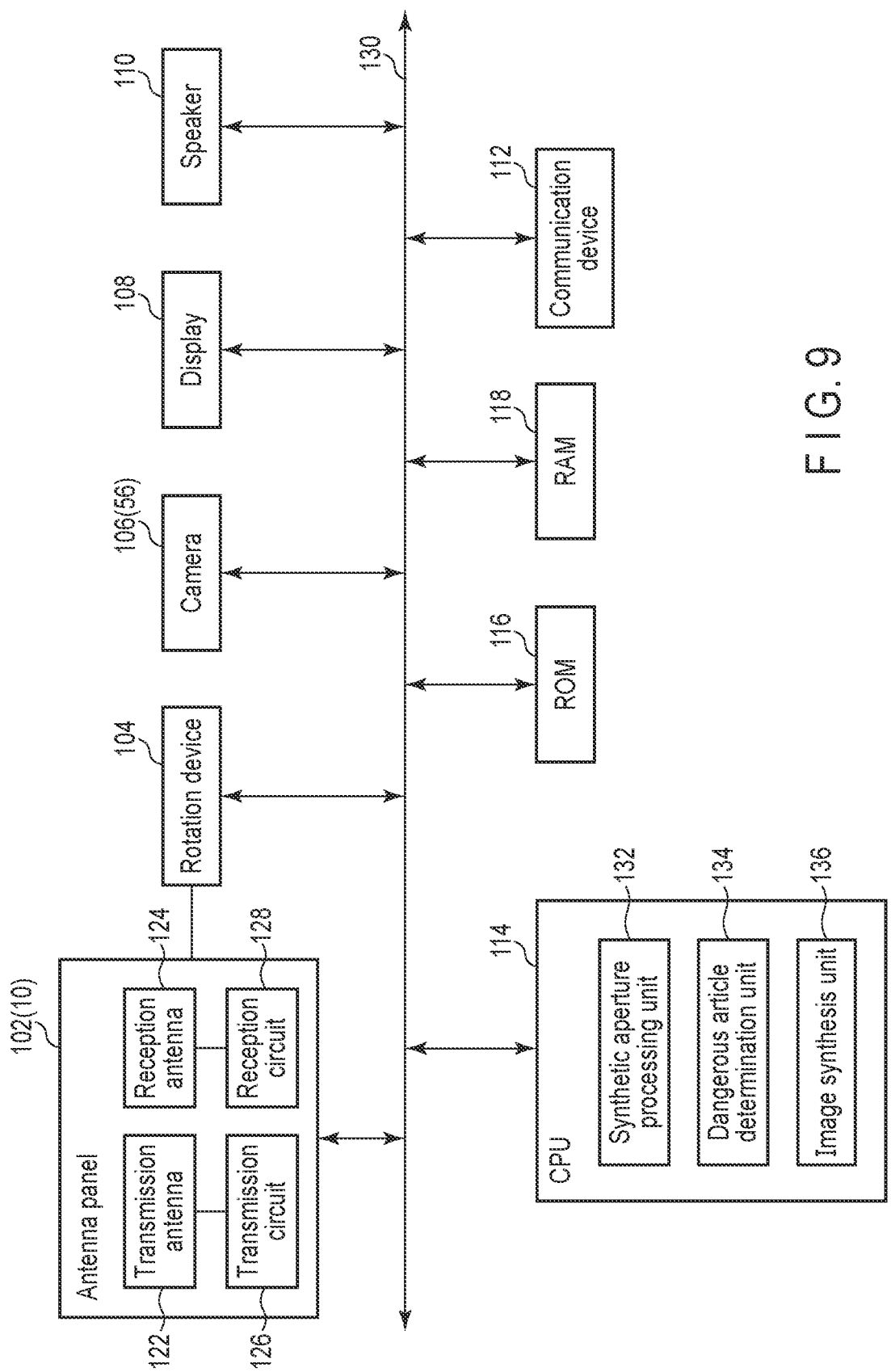
FIG. 9 is a block diagram showing an example of the electrical configuration of an inspection device according to the first embodiment.

FIG. 9 is a block diagram showing an example of the electrical configuration of the inspection device according to the first embodiment. The inspection device includes an antenna panel 102 (equivalent to the antenna panel 10 illustrated in FIG. 1 and the like), a rotation device 104, a camera 106 (equivalent to the camera 56 illustrated in FIG. 6 and the like), a display 108, a speaker 110, a communication device 112, a CPU 114, a ROM 116, and a RAM 118. The antenna panel 102, the rotation device 104, the camera 106, the display 108, the speaker 110, the communication device 112, the CPU 114, the ROM 116, and the RAM 118 are connected to a bus line 130.

The antenna panel 102 includes a first transmission antenna Tx1 (equivalent to the transmission antennas Tx1 and Tx2 illustrated in FIG. 1 and the like) that irradiates radio waves to the inspection area, a reception antenna 124 (equivalent to the reception antennas Rx1 to Rx7 illustrated in FIG. 1 and the like) that receives reflected waves from the inspection area, a transmission circuit 126, and a reception circuit 128. The transmission circuit 126 supplies, to the first transmission antenna Tx1, a high-frequency signal for irradiating a transmission pulse. The reception circuit 128 outputs a reception signal according to the reflected wave received by the reception antenna 124.

The rotation device 104 includes a motor that rotates the antenna panel 102. A rotation shaft (Although not illustrated in FIG. 9, it is equivalent to the rotation shaft 18 illustrated in FIG. 4 and the like) of the antenna panel 102 is attached to the rotation device 104.

The camera 106 captures an image of the inspection area in order to detect the entry of the subject 58 into the inspection area. The camera 106 may also perform the signal process of detecting entry of the subject 58 into the inspection area by performing the image process on the captured image to detect a person. Instead of the camera 106, a sensor that detects entry of the subject 58 into the inspection area may be used.

The display 108 displays an inspection result. The inspection result may be superimposed and displayed on the camera image captured by the camera 106. The speaker 110 outputs an alarm sound or the like according to the inspection result.

The communication device 112 communicates data with other devices. Examples of the communication include wired LAN, wireless LAN, and near field communication (Bluetooth (registered trademark) or the like).

The ROM 116 stores an application program of the CPU 114.

The RAM 118 functions as a working memory that temporarily stores data and the like during the operation of the CPU 114.

The CPU 114 functions as a synthetic aperture processing unit 132, a dangerous article determination unit 134, and an image synthesis unit 136 by executing the application program. The CPU 114 may include a signal processing unit that detects the entry of the subject 58 into the inspection area by performing the image process on the captured image of the camera 106 to detect the person.

The synthetic aperture processing unit 132 receives the reception signal of the reception antenna 124 and performs the synthetic aperture process on the reception signal to form a virtual antenna array.

The dangerous article determination unit 134 obtains the reflection intensity of the radio wave by the object from the output of the synthetic aperture processing unit 132. Since the reflection intensity of the radio wave on the human skin is different from the reflection intensity of the radio wave on a dangerous article such as a metal or an explosive, the dangerous article determination unit 134 determines whether the subject 58 possesses a dangerous article based on the reflection intensity of the radio wave. The dangerous article determination unit 134 outputs a determination result that is information on the reflective object. Furthermore, the dangerous article determination unit 134 may perform imaging of a dangerous article based on the reflection intensity of the radio wave.

When the dangerous article determination unit 134 performs imaging of a dangerous article, the image synthesis unit 136 may extract an outline of the subject 58 from the image of the subject 58 captured by the camera 106, and generate a synthesized image in which an imaging result of the dangerous article is superimposed on the extracted outline image. In a case where the dangerous article determination unit 134 does not perform imaging of a dangerous article, the image synthesis unit 136 is omitted.

Although not illustrated, the inspection device may include a keyboard for instructing and inputting setting information, inspection start/end, and the like.

The inspection device may not include the CPU 114, the camera 106, the display 108, the speaker 110, and the like, and the inspection device may be configured to include only the antenna panel 102 and the rotation device 104. In this case, the CPU 114, the camera 106, the display 108, the speaker 110, and the like may be included in an external device different from the inspection device, and a reception signal from the antenna panel 102 may be transmitted to the external device by the communication device 112 and input to the CPU 114. The external device may be formed as a cloud server.

An example of the inspection by the inspection device will be described. FIG. 10 is a flowchart illustrating an example of the process of the CPU 114 of the inspection device.

The CPU 114 operates the camera 106 (step 142). The camera 106 captures an image of the inspection area. Here, it is assumed that the CPU 114, not the camera 106, includes a signal processing unit that detects the entry of the subject 58 into the inspection area by detecting the person by performing the image process on the captured image of the camera 106. Therefore, in step 142, the CPU 114 writes the camera signal output from the camera 106 to the RAM 118.

The CPU 114 performs the image process on the camera image and determines whether the camera image includes a person (step 144). When the camera image does not include a person (No in step 144), the CPU 114 repeatedly executes the determination step 144.

When the camera image includes a person (Yes in step 144), it means that the subject 58 has entered the inspection area. Therefore, the CPU 114 drives the rotation device 104 to rotate the antenna panel 102 by a certain angle, for example, 5 degrees (step 146). When the antenna panel 102 rotates by a certain angle, the rotation of the antenna panel 102 is temporarily stopped.

While the rotation of the antenna panel 102 is temporarily stopped, the CPU 114 causes the first transmission antenna Tx1 to irradiate a transmission pulse (step 148) and the reception antenna 124 to receive a reception signal (step 150). When there is a plurality of transmission antennas 122, for example, two transmission antennas Tx1 and Tx2, the CPU 114 repeats step 148 and step 150 by the number of transmission antennas Tx1 and Tx2. As a result, the CPU 114 causes the first transmission antenna Tx1 to irradiate the transmission pulse (step 148), the reception antennas Rx1 to Rx7 to receive the reception signals (step 150), causes the transmission antenna Tx2 to irradiate the transmission pulse (step 148), and the reception antennas Rx1 to Rx7 to receive the reception signals (step 150).

In order to form the two-dimensional virtual array antenna as illustrated in FIG. 5, it is necessary to rotate the antenna panel 102 by 180 degrees. Therefore, the CPU 114 determines whether the antenna panel 102 is rotated by 180 degrees (step 152).

When the rotation angle of the antenna panel 102 has not reached 180 degrees (No in step 152), the CPU 114 executes the rotation process in step 146 again.

When the antenna panel 102 is rotated by 180 degrees (Yes in step 152), the reception signals of the antenna panel 102 for obtaining the reception signals of all the virtual antennas forming the two-dimensional virtual array antenna are received, so that the CPU 114 performs the synthetic aperture process on the reception signals of the antenna panel 102 (step 154).

As a result of the synthetic aperture process, the CPU 114 can obtain the reflection intensity of the radio wave at each distance from the antenna panel 102, and obtain a radar image that images an object on a plane parallel to the antenna panel 102 in the inspection area.

The CPU 114 performs a dangerous article determination process based on the result of the synthetic aperture process (step 156). The CPU 114 can determine whether the object that exists in the inspection area and reflects the radio wave is part of the human body or a dangerous article based on the reflection intensity of the object. When determining that the dangerous article exists in the inspection area, the CPU 114 may cause the speaker 110 to output an alarm sound.

The CPU 114 synthesizes the camera image of the subject 58 captured by the camera 106 and the radar image obtained by the synthetic aperture process by the image synthesis process, and displays a synthesized image in which a dangerous article is displayed on the outline of the subject 58 on the display 108 (step 158).

As a result, the inspector can determine whether the subject 58 possesses a dangerous article by observing the screen of the display 108.

FIGS. 11A and 11B illustrate display examples of the synthesized image in step 158. FIG. 11A illustrates a display example in a case where the subject 58 is inspected from the side as illustrated in FIG. 6. FIG. 11B illustrates a display example in a case where the subject 58 is inspected from the front as illustrated in FIG. 7. The synthesized image includes a dangerous article image 160 such as a handgun.

According to the first embodiment, by rotating the array antenna 10 on a plane including the array antenna 10 and performing the synthetic aperture process on the reception signal, it is possible to form a virtual array antenna including the virtual antennas whose number is greater than the actual number of antennas. Since the distance between antennas of the actual array antenna is longer than half wavelength, interference between antennas does not occur. In addition, since the array antenna returns to the initial position after one rotation, there is no need to rotate the array antenna in the opposite direction to return to the initial position after scanning. Therefore, the subject 58 who is walking can be continuously inspected without stopping, and the inspection can be executed in a short time.

Hereinafter, a modification of the first embodiment will be described.

(First Modification)

The arrangement examples of the array antenna illustrated in FIGS. 6 to 8 are arrangement examples of an inspection device fixed to a facility. As a first modification, a portable inspection device will be described.

Figure 12:
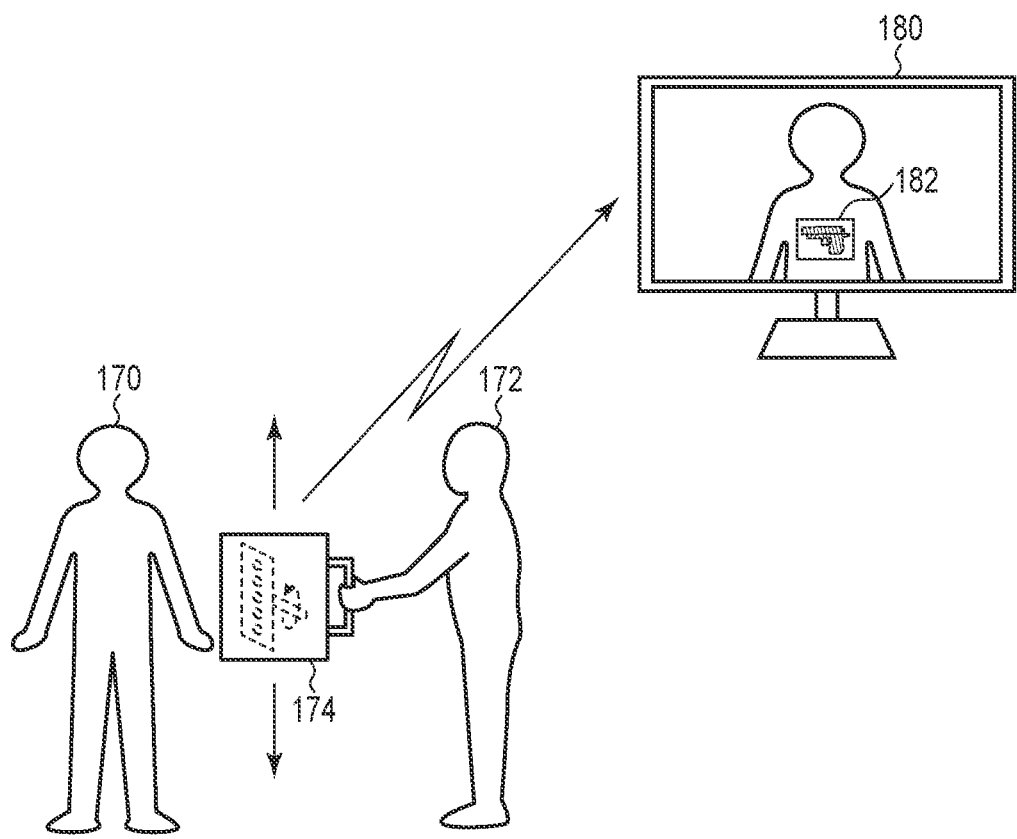
FIG. 12 illustrates an example of inspection by a handheld scanner according to a first modification.

FIG. 12 shows a mobile, portable, handheld scanner 174. Since the configuration of the handheld scanner 174 is similar to the configuration of the inspection device illustrated in FIG. 9, illustration is omitted. The handheld scanner 174 includes elements other than the display 108 among the elements of the inspection device shown in FIG. 9. In FIG. 9, the camera 106 is provided on a wall or the like outside the inspection device, but the handheld scanner 174 incorporates the camera 106. Further, the handheld scanner 174 comprises a start/end switch for the inspector 172 to instruct the handheld scanner 174 to start/end a scan.

The display 108 illustrated in FIG. 9 is included in an external device 180. The external device 180 also includes a communication device similar to the communication device 112 illustrated in FIG. 9, and communicates with the handheld scanner 174 wirelessly or by wire. The external device 180 may display an indicator mark 182 indicating an imaging position by the handheld scanner 174 in the synthesized image.

An inspector 172 standing near the subject 170 has the handheld scanner 174 with the antenna panel 102 facing the subject 170. In this state, the antenna panel 102 rotates and the subject 170 is irradiated with the transmission pulse, whereby the subject 170 is imaged.

When the handheld scanner 174 is small, imaging in a sufficient range may not be performed. In this case, the inspector 172 changes the imaging range by moving the handheld scanner 174 up and down.

Figure 13:
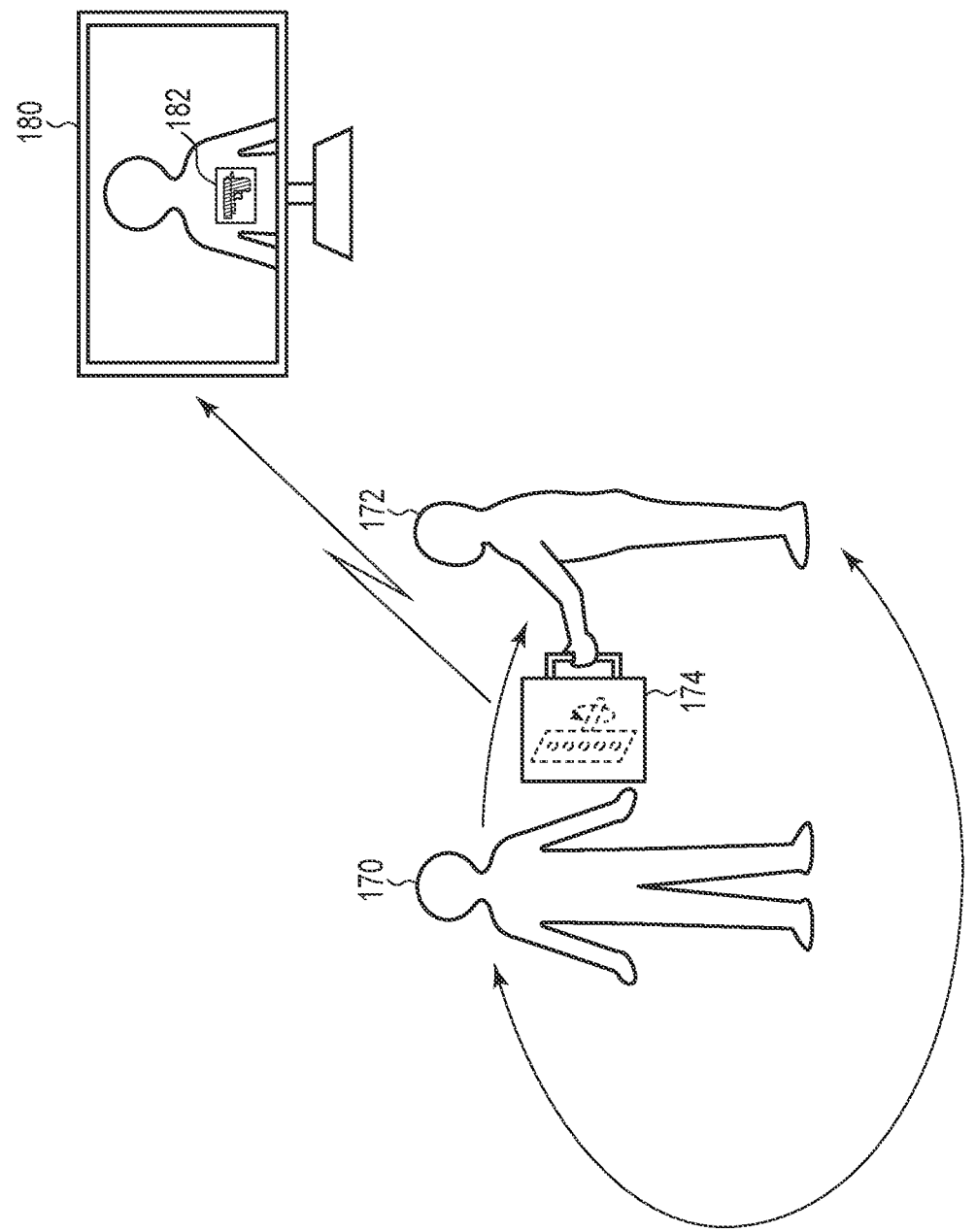
FIG. 13 illustrates another example of inspection by a handheld scanner according to the first modification.

The scanning direction is not limited to the vertical direction. FIG. 13 illustrates an example in which scanning is performed in a circumferential direction around the subject 170. The inspector 172 may walk around the subject 170 while holding the handheld scanner 174 with the antenna panel 102 facing the subject 170, and perform imaging from each surrounding direction.

The external device 180 may display an indicator mark 182 indicating an imaging position by the handheld scanner 174 in the synthesized image. The inspector 172 can check the position of the handheld scanner 174 by the indicator mark 182, and can adjust the position of the handheld scanner 174 so that a desired range can be imaged.

Figure 14:
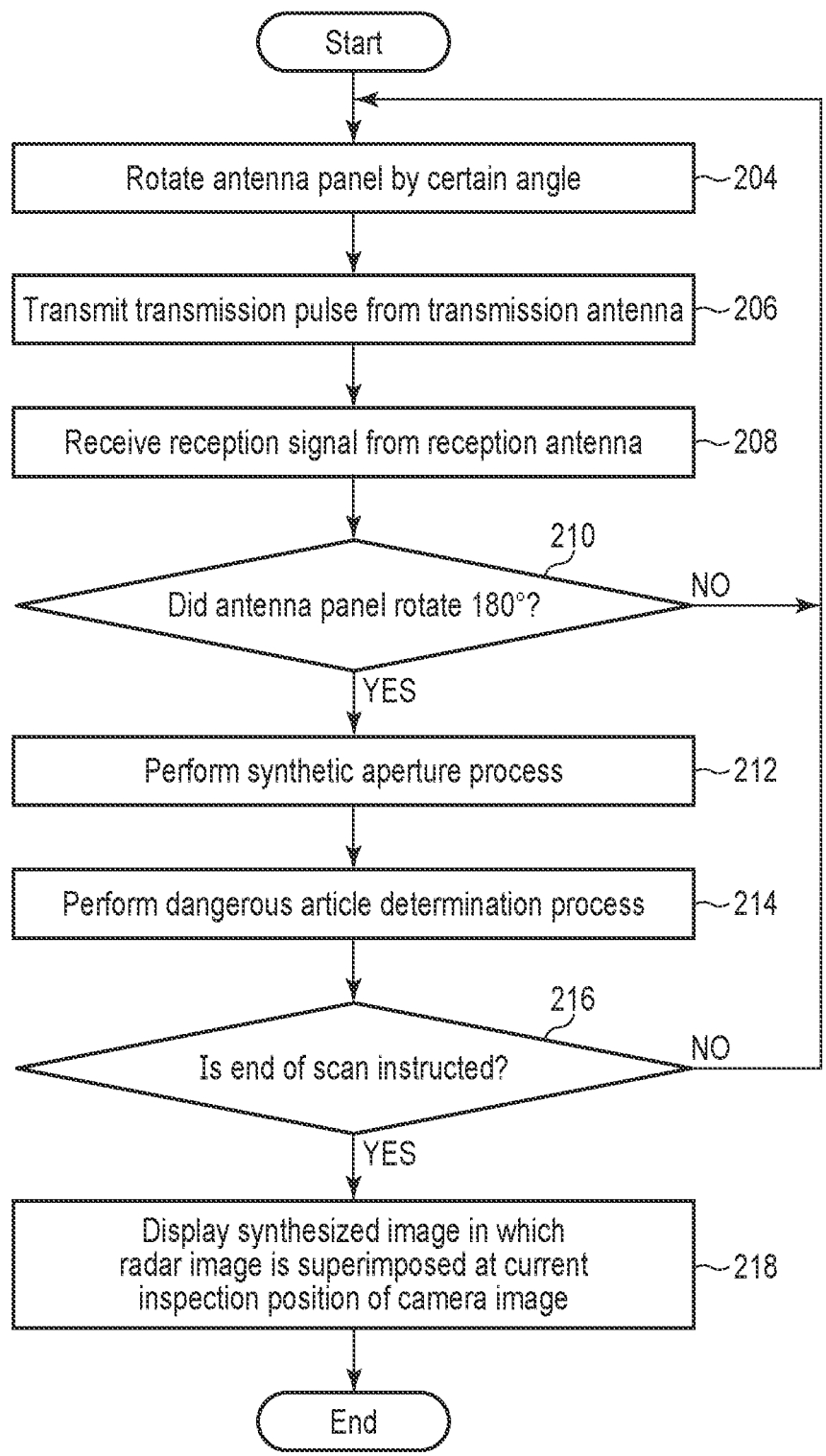
FIG. 14 is a flowchart illustrating an example of inspection by an inspection system according to the first modification.

FIG. 14 is a flowchart illustrating an example of inspection by the inspection device according to the first modification.

When the start switch is pressed, the CPU 114 included in the handheld scanner 174 drives the rotation device 104 to rotate the antenna panel 102 by a certain angle, for example, 5 degrees (step 204).

The CPU 114 causes the first transmission antenna Tx1 to irradiate a transmission pulse (step 206), and the reception antenna 124 to receive a reception signal (step 208).

The CPU 114 determines whether the antenna panel 102 is rotated by 180 degrees (step 210).

When the rotation angle of the antenna panel 102 has not reached 180 degrees (No in step 210), the CPU 114 executes the rotation process in step 204 again.

When the antenna panel 102 is rotated by 180 degrees (Yes in step 210), the CPU 114 performs the synthetic aperture process on the reception signal of the antenna panel 102 (step 212).

The CPU 114 performs a dangerous article determination process based on the result of the synthetic aperture process (step 214).

The CPU 114 determines whether the end of the scan has been instructed, that is, whether the end switch has been pressed (step 216).

When the end of the scan is not instructed (No in step 216), the CPU 114 executes the rotation process in step 204 again.

When the end of the scan is instructed (Yes in step 216), a synthesized image obtained by superimposing the radar image obtained by the synthetic aperture process on the current inspection position of the camera image of the subject 58 captured by the camera 106 is transmitted to the external device 180 and displayed by the external device 180 (step 218).

As a result, the inspector 172 can determine whether the subject 170 possesses a dangerous article by observing the screen of the external device 180.

(Second Modification)

In the antenna panel of the first embodiment, the center of the array antenna is the rotation center. Therefore, when the antenna panel is rotated by 180 degrees, a virtual antenna having a circular synthetic aperture located on the entire circumference of 360 degrees can be generated as illustrated in FIG. 5.

As a second modification, an antenna panel having an end portion of an array antenna as a rotation center will be described.

FIG. 15 is a plan view of an example of an antenna panel 20 according to the second modification.

The antenna panel 20 includes a linear array antenna disposed on a substrate 21. FIG. 15 illustrates a linear substrate 21, but the shape of the substrate 21 does not necessarily correspond to the shape of the array antenna. A circuit module (not illustrated) may be disposed on the substrate 21. The substrate 21 on which the array antenna and the circuit module are disposed may have a rectangular shape. The array antenna includes at least one transmission antenna (here, two transmission antennas Tx1 and Tx2) and at least one reception antenna (here, four reception antennas Rx1, Rx2, Rx3, and Rx4).

Similarly to the first embodiment, the first transmission antenna Tx1, the reception antennas Rx1 to Rx4, and the transmission antenna Tx2 are disposed with an equal distance therebetween along a line in this order. That is, the transmission antennas Tx1 and Tx2 are disposed at the outer sides of the reception antennas Rx1 to Rx4. A distance between two adjacent antennas among the first transmission antenna Tx1, the reception antennas Rx1 to Rx4, and the transmission antennas Tx2 is a length of a wavelength of the radio wave to be irradiated and received.

When the reception signals of the reception antennas Rx1 to Rx4 when the first transmission antenna Tx1 irradiates the transmission pulse are subjected to the synthetic aperture process, a virtual array antenna 22 including the virtual antennas v1 to v4 located at the midpoints of the first transmission antenna Tx1 and the reception antennas Rx1 to Rx4 is formed as illustrated in FIG. 15.

When the reception signals of the reception antennas Rx1 to Rx4 when the transmission antennas Tx2 irradiates the transmission pulse are subjected to the synthetic aperture process, a virtual array antenna 24 including the virtual antennas v14 to v11 located at the midpoints of the transmission antennas Tx2 and the reception antennas Rx1 to Rx4 is formed as illustrated in FIG. 16.

The distance between virtual antennas of the virtual array antenna 22 and the virtual array antenna 24 is half the distance between the antennas of the array antenna on the substrate 21. That is, the distance between two adjacent virtual antennas among the virtual antennas v1 to v4 and the distance between two adjacent virtual antennas among the virtual antennas v14 to v11 are half wavelength of the radio wave to be irradiated and received.

Figure 17:
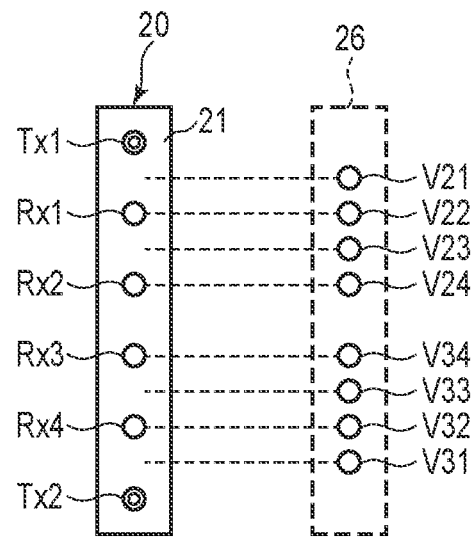
FIG. 17 is a plan view of a further example of an antenna panel according to the second modification.

FIG. 17 illustrates a virtual array antenna 26 formed when the pairs of the transmission antennas Tx1 and the respective reception antennas Rx1 to Rx7 and the pairs of the transmission antennas Tx2 and the respective reception antennas Rx1 to Rx7 transmit and receive transmission pulses. The virtual array antenna 26 includes virtual antennas v21 to v24 (equivalent to the virtual antennas v1 to v4 in FIG. 15) obtained by performing the synthetic aperture process on the reception signals of the reception antennas Rx1 to Rx4 that receive the transmission pulse of the first transmission antenna Tx1, and virtual antennas v34 to v31 (equivalent to the virtual antennas v14 to v11 in FIG. 16) obtained by performing the synthetic aperture process on the reception signals of the reception antennas Rx1 to Rx4 that receive the transmission pulse of the transmission antennas Tx2.

The distance between the virtual antenna v24 and the virtual antenna v34 is a length of a wavelength of the radio wave to be irradiated and received.

Figure 18:
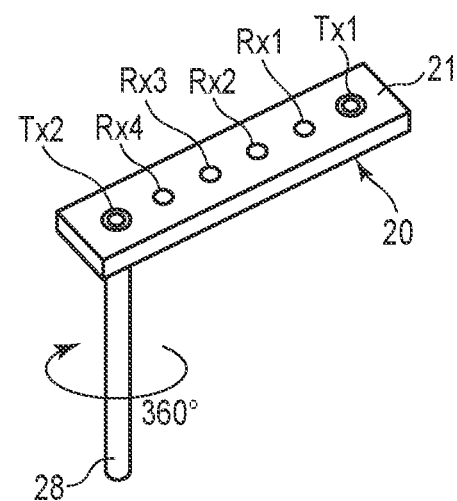
FIG. 18 illustrates an example of rotation of the antenna panel according to the second modification.

FIG. 18 is a perspective view of an example of the antenna panel 20 according to the second modification. The transmission antennas Tx1 and Tx2 and the reception antennas Rx1 to Rx4 are disposed on the surface of the substrate 21. A rotation shaft 28 orthogonal to the substrate 21 is attached to the back face of the substrate 21. The rotation shaft 28 is attached to the position of the first transmission antenna Tx1 or the transmission antennas Tx2 (here, the transmission antennas Tx2) located at one end of the array antenna on the substrate 21. The distance from the rotation shaft 28 to the second transmission antenna Tx2 is shorter than any of the distances from the rotation shaft 18 to all the respective reception antennas Rx1 to Rx4 included in the antenna panel 20. A motor intermittently rotates the antenna panel 20 through the rotation shaft 28, for example, on a 5 degrees basis. That is, the antenna panel 20 rotates around the end of the array antenna.

When the rotation angle of the antenna panel 20 is 0 degrees, a transmission pulse is irradiated from the first transmission antenna Tx1, and the reception signals of the reception antennas Rx1 to Rx4 are subjected to the synthetic aperture process, so that reception signals of the virtual antennas v21 to v24 forming half of the virtual array antenna 26 are obtained. Next, the transmission pulse is irradiated from the transmission antennas Tx2, and the reception signals of the reception antennas Rx1 to Rx4 are subjected to the synthetic aperture process, so that the reception signals of the virtual antennas v34 to v31 forming the remaining half of the virtual array antenna 26 are obtained.

When the antenna panel 20 rotates by 5 degrees, the rotation of the antenna panel 20 is temporarily stopped. Also at this time, the transmission pulses are sequentially irradiated from the first transmission antenna Tx1 and the transmission antennas Tx2, and the reception signals of the reception antennas Rx1 to Rx4 are subjected to the synthetic aperture process, whereby the reception signals of the virtual antennas v21 to v24 and v34 to v31 forming the virtual array antenna 26 are obtained.

Hereinafter, similarly, every time the motor rotates the antenna panel 20 by 5 degrees, the rotation of the antenna panel 20 is temporarily stopped, the transmission pulses are sequentially irradiated from the transmission antennas Tx1 and Tx2, and the reception signals of the reception antennas Rx1 to Rx4 are subjected to the synthetic aperture process, whereby the reception signals of the virtual antennas v21 to v24 and v34 to v31 forming the virtual array antenna 26 are obtained.

As described above, the antenna panel 20 including the four reception antennas Rx1 to Rx4 disposed with a distance of a wavelength therebetween rotates by 360 degrees around the end in the length direction as the rotation center, and every time the antenna panel rotates by a certain angle, the transmission pulse is irradiated and received and the synthetic aperture process is performed, so that a two-dimensional virtual array antenna having a circular synthetic aperture is formed.

Figure 19:
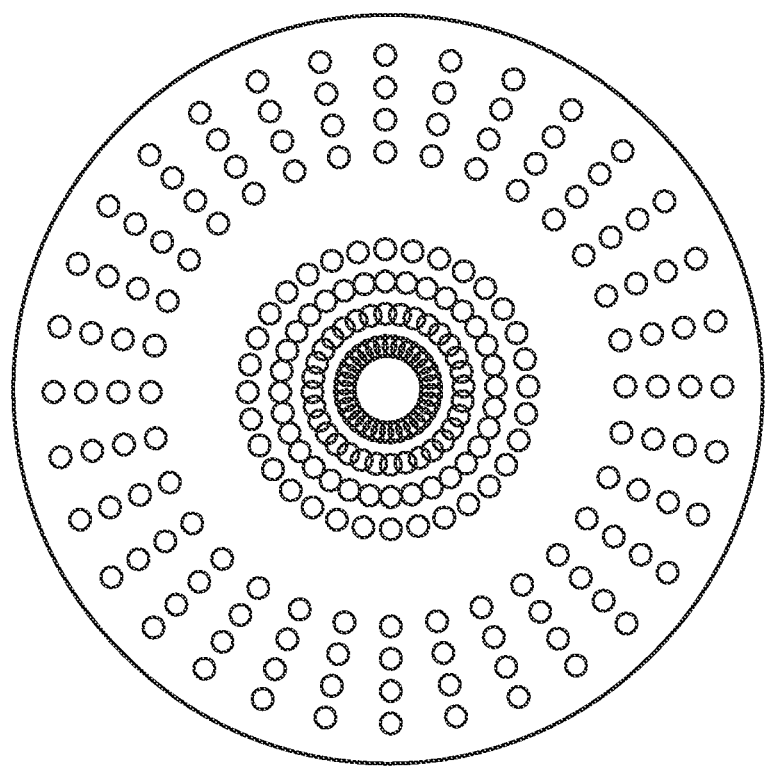
FIG. 19 illustrates an example of a two-dimensional virtual array antenna according to the second modification.

FIG. 19 illustrates an example of a two-dimensional virtual array antenna. The two-dimensional virtual array antenna illustrated in FIG. 19 includes virtual antennas disposed with a regular distance therebetween on the entire circumference of 360 degrees of first four concentric circles with a distance of half wavelength therebetween and on the entire circumference of 360 degrees of second four concentric circles with a distance of half wavelength therebetween. The distance between the outermost circle of the inner four concentric circles and the innermost circle of the outer four concentric circles is a wavelength. The circumferential distance between the virtual antennas depends on a rotation angle of the intermittent rotation of the antenna panel 20 by the motor.

When the antenna panel 10 of the first embodiment is rotated by 180 degrees, a two-dimensional virtual array antenna as illustrated in FIG. 5 can be formed. The antenna panel of the second modification has to rotate by 360 degrees, which is double that in the first embodiment, in order to form a two-dimensional virtual array antenna as illustrated in FIG. 19. However, while the antenna panel 10 of the first embodiment requires seven reception antennas Rx1 to Rx7 corresponding to the diameter of the virtual array antenna having the circular synthetic aperture, the antenna panel 20 of the second modification requires only four reception antennas Rx1 to Rx4 corresponding to the radius of the virtual array antenna having the circular synthetic aperture. Therefore, in the second modification, although the time required for the rotation is large, the cost is low because the number of antennas is small.

(Third Modification)

The above-described antenna panel forms a two-dimensional virtual array antenna in which virtual antennas are disposed with a regular distance therebetween on the entire circumference of 360 degrees of concentric circles by rotation of 180 degrees or 360 degrees. Next, third and fourth modifications that can make the rotation angle smaller than 180 degrees will be described.

Figure 20B:
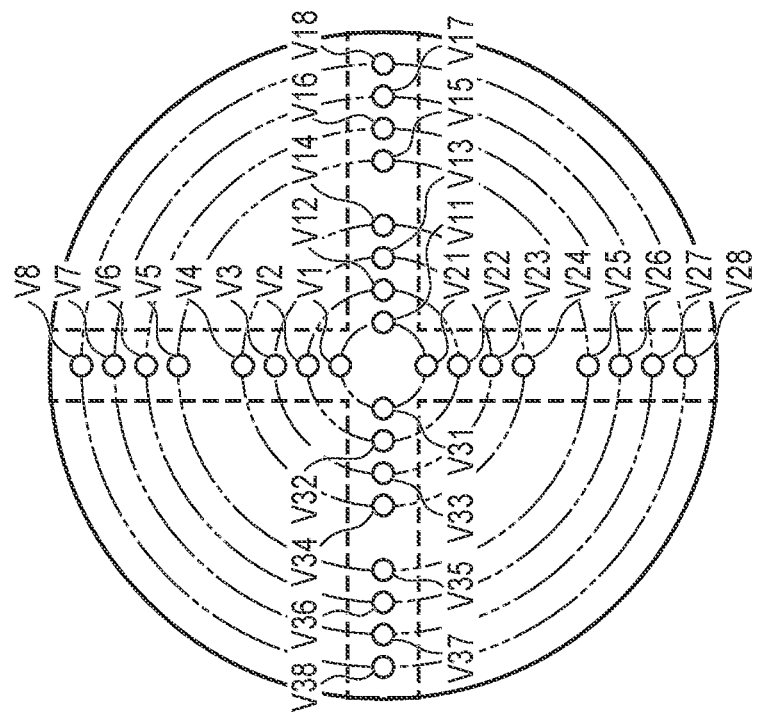
FIGS. 20A and 20B are plan views of an example of an antenna panel according to a third modification.
Figure 20A:
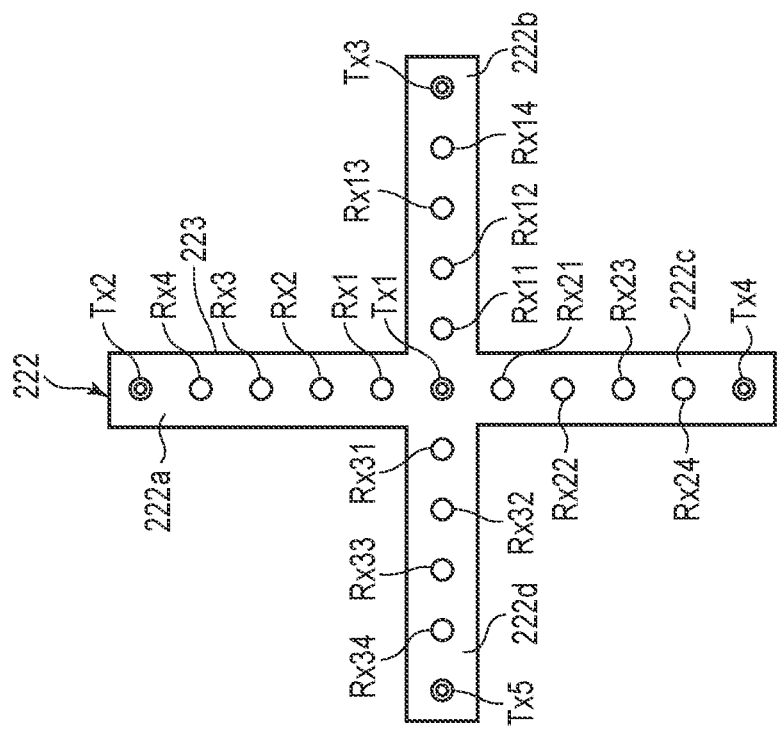

FIG. 20A is a plan view of an example of an antenna panel 222 according to a third modification.

The antenna panel 222 includes cross-shaped array antennas disposed on a substrate 223. FIG. 20A illustrates a cross-shaped substrate 223, but the shape of the substrate 223 does not necessarily correspond to the shape of the array antenna. The cross-shaped array antenna includes four arms 222a, 222b, 222c, and 222d whose angles are shifted by 90 degrees. The first arm 222a includes two transmission antennas Tx1 and Tx2 and four reception antennas Rx1, Rx2, Rx3, and Rx4. The second arm 222b includes two transmission antennas Tx1 and Tx3 and four reception antennas Rx11, Rx12, Rx13, and Rx14. The third arm 222*c* includes two transmission antennas Tx1 and Tx4 and four reception antennas Rx21, Rx22, Rx23, and Rx24. The fourth arm 222*d* includes two transmission antennas Tx1 and Tx5 and four reception antennas Rx31, Rx32, Rx33, and Rx34.

In each arm 222*a* to 222*d*, the two transmission antennas Tx1 and Tx2 are disposed so as to sandwich the four reception antennas. In each arm 222*a* to 222*d*, one of the two transmission antennas Tx1 and Tx2 (here, the first transmission antenna Tx1) located at the center of the cross-shaped array antenna is common.

In each arm 222*a* to 222*d*, a distance between two adjacent antennas among the two transmission antennas Tx1 and Tx2 and the two reception antennas is a length of a wavelength of the radio wave. Therefore, in each arm 222*a* to 222*d*, when the reception signals of the four reception antennas are subjected to the synthetic aperture process, the reception signals are equivalent to the reception signals of the virtual antennas located at the midpoints of the two transmission antennas Tx1 and Tx2 and the four reception antennas.

For example, in the first arm 222*a*, when the reception signals of the reception antennas Rx1 to Rx4 that receive the reflected wave of the transmission pulse irradiated from the first transmission antenna Tx1 are subjected to the synthetic aperture process, the reception signals of the virtual antennas v1 to v4 are obtained. Next, when the reception signals of the reception antennas Rx1 to Rx4 that receive the reflected signal of the transmission pulse irradiated from the transmission antennas Tx2 are subjected to the synthetic aperture process, the reception signals of the virtual antennas v5 to v8 are obtained.

The rotation shaft is attached to the center of the cross-shaped array antenna, that is, the position of the first transmission antenna Tx1.

When the antenna panel 222 rotates by 90 degrees, similarly to the second modification illustrated in FIG. 19, a two-dimensional virtual array antenna is formed in which virtual antennas are disposed with a regular distance therebetween on the entire circumference of 360 degrees of eight concentric circles as illustrated in FIG. 20B. The distance between adjacent circles of the outer four concentric circles is half wavelength. The distance between adjacent circles of the inner four concentric circles is half wavelength. The distance between the innermost circle of the outer four concentric circles and the outermost circle of the inner four concentric circles is a wavelength.

In order to form a two-dimensional virtual array antenna in which virtual antennas are disposed with a regular distance therebetween on the entire circumference of 360 degrees, in the second modification, it is necessary to rotate the linear antenna panel 20 by 360 degrees. In the third modification, since the antenna panel 222 rotates at the center of the cross-shaped array antenna, it is possible to form a two-dimensional virtual array antenna in which virtual antennas are disposed with a regular distance therebetween on the entire circumference of 360 degrees only by rotating it by 90 degrees. The third modification can shorten the time required for rotation to ¼ of that in the second modification. Note that the third modification requires twelve reception antennas. In the second modification, four reception antennas are sufficient and cost is low.

(Fourth Modification)

Figure 21B:
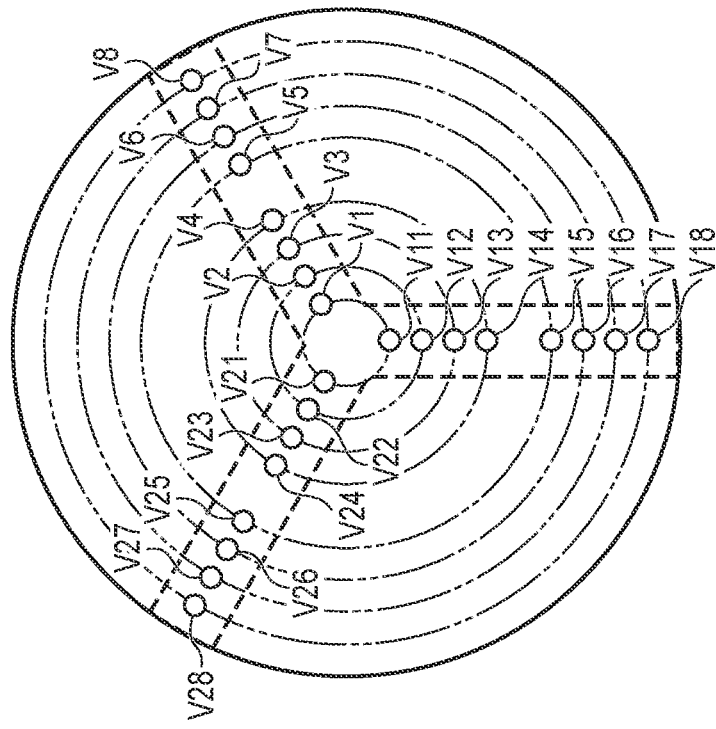
FIGS. 21A and 21B are plan views of an example of an antenna panel according to a fourth modification.
Figure 21A:
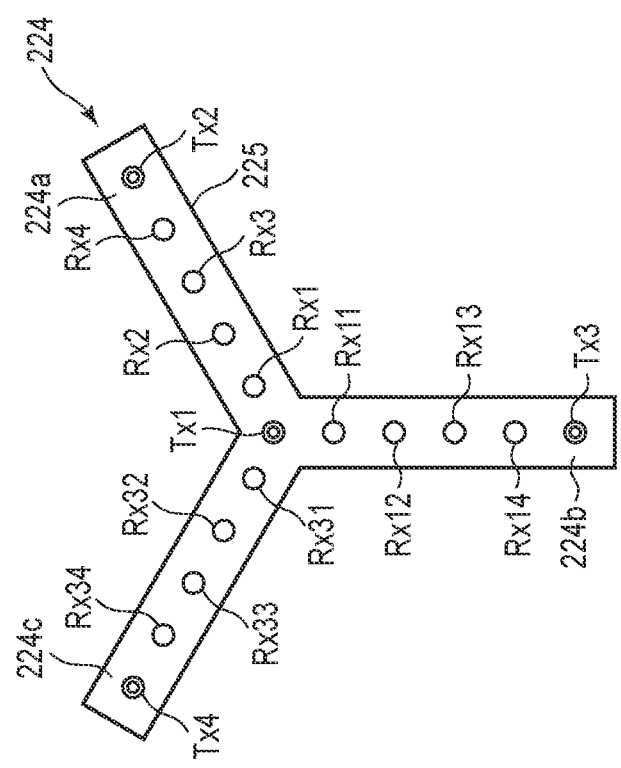

FIG. 21A is a plan view of an example of an antenna panel 224 according to a fourth modification.

An antenna panel 224 includes a trifurcated or Y-shaped array antenna disposed on a substrate 225. FIG. 21A illustrates a Y-shaped substrate 225, but the shape of the substrate 225 does not necessarily correspond to the shape of the array antenna. The Y-shaped array antenna includes three arms 224*a*, 224*b*, and 224*c* whose angles are shifted by 120 degrees. The first arm 224*a* includes two transmission antennas Tx1 and Tx2 and four reception antennas Rx1, Rx2, Rx3, and Rx4. The second arm 224*b* includes two transmission antennas Tx1 and Tx3 and four reception antennas Rx11, Rx12, Rx13, and Rx14. The third arm 224*c* includes two transmission antennas Tx1 and Tx4 and four reception antennas Rx21, Rx22, Rx23, and Rx24.

In each arm 224*a* to 224*c*, the two transmission antennas are disposed so as to sandwich the four reception antennas. In each arm 224*a* to 224*c*, one of the two transmission antennas Tx1 and Tx2 (here, the first transmission antenna Tx1) located at the center of the Y-shaped array antenna is common.

In each arm 224*a* to 224*c*, a distance between two adjacent antennas among the two transmission antennas and the four reception antennas is a length of a wavelength of the radio wave. Therefore, in each arm 224*a* to 224*c*, the reception signals of the four reception antennas are equivalent to the reception signals of the virtual antennas located at the midpoints of the two transmission antennas and the four reception antennas.

For example, in the first arm 224*a*, when the reception signals of the reception antennas Rx1 to Rx4 that receive the transmission pulse irradiated from the first transmission antenna Tx1 are subjected to the synthetic aperture process, the reception signals of the virtual antennas v1 to v4 are obtained. Next, when the reception signals of the reception antennas Rx1 to Rx4 that receive the reflected signal of the transmission pulse irradiated from the transmission antennas Tx2 are subjected to the synthetic aperture process, the reception signals of the virtual antennas v5 to v8 are obtained.

The rotation shaft is attached to the center of the Y-shaped array antenna, that is, the position of the first transmission antenna Tx1.

When the antenna panel 224 rotates by 120 degrees, similarly to the third modification illustrated in FIG. 20B, a two-dimensional virtual array antenna is formed in which virtual antennas are disposed with a regular distance therebetween on the entire circumference of 360 degrees of eight concentric circles as illustrated in FIG. 21B. The distance between adjacent circles of the outer four concentric circles is half wavelength. The distance between adjacent circles of the inner four concentric circles is half wavelength. The distance between the innermost circle of the outer four concentric circles and the outermost circle of the inner four concentric circles is a wavelength.

The third modification and the fourth modification will be compared. In order to form a two-dimensional virtual array antenna in which virtual antennas are disposed with a regular distance therebetween on the entire circumference of 360 degrees, in the third modification, the antenna panel 222 including the cross-shaped array antennas is rotated by 90 degrees. In the fourth modification, the antenna panel 224 is rotated by 120 degrees at the center of the Y-shaped array antenna. As described above, the rotation angle of the third modification is smaller than that of the fourth modification. However, under the condition that the number of virtual array antennas (eight) is equal, the number of antennas (sixteen) forming the array antenna of the fourth modification is smaller than the number of antennas (twenty one) forming the array antenna of the third modification.

(Fifth Modification)

The antenna panel described above uses two transmission antennas Tx1 and Tx2. Next, fifth and sixth modifications using only a transmission antenna Tx1 will be described.

Figure 22B:
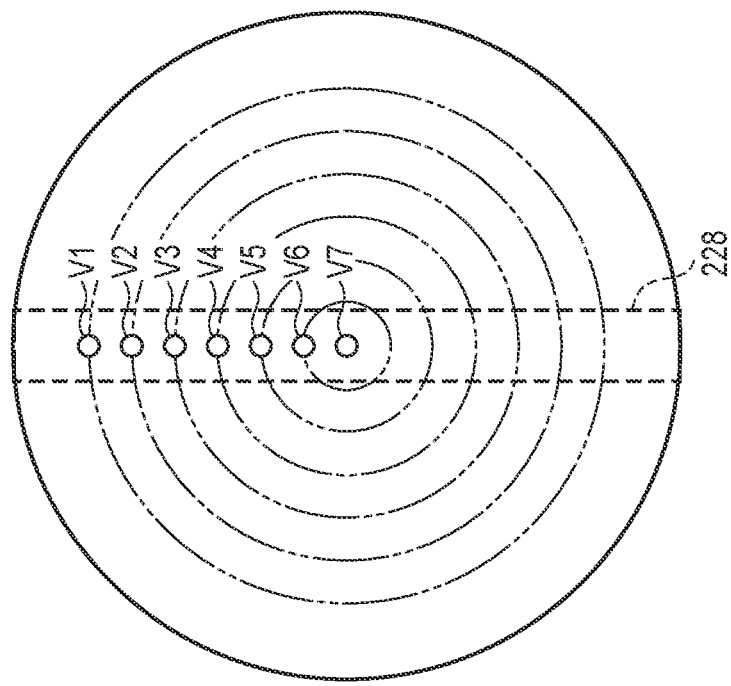
FIGS. 22A and 22B are plan views of an example of an antenna panel according to a fifth modification.
Figure 22A:
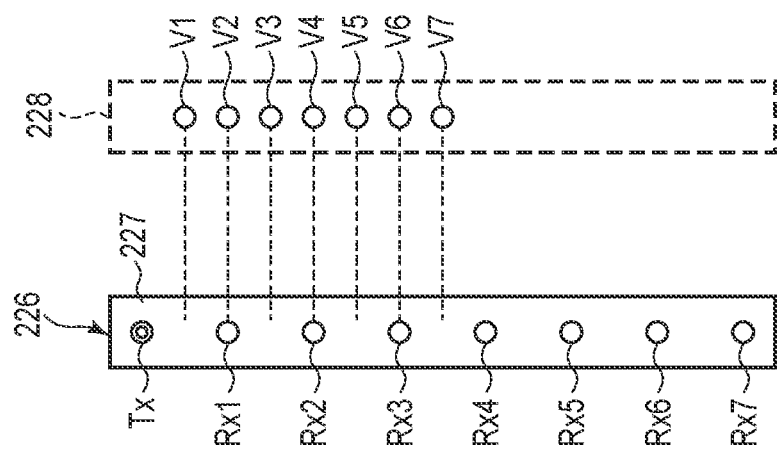

FIG. 22A is a plan view of an example of an antenna panel 226 according to a fifth modification.

The antenna panel 226 includes a linear array antenna disposed on a substrate 227. FIG. 22A illustrates a linear substrate 227, but the shape of the substrate 227 does not necessarily correspond to the shape of the array antenna. The array antenna includes a transmission antenna Tx1 and at least one reception antenna (here, seven reception antennas Rx1, Rx2, Rx3, Rx4, Rx5, Rx6, and Rx7). A circuit module (not illustrated) may be disposed on the substrate 227. The transmission antenna Tx1 and the reception antennas Rx1 to Rx7 are disposed with an equal distance therebetween along a line. The distance between antennas is a length of a wavelength of the radio wave. The reception antennas Rx1 to Rx7 form a reception array antenna. The transmission antenna Tx1 is disposed outside a reception antenna at one end of the reception array antenna.

When the reception signals of the reception antennas Rx1 to Rx7 when the transmission antenna Tx1 irradiates the transmission pulse are subjected to the synthetic aperture process, a virtual array antenna 228 including the virtual antennas v1 to v7 located at the midpoints of the transmission antenna Tx1 and the reception antennas Rx1 to Rx7 is formed. A distance between two adjacent virtual antennas among the virtual antennas v1 to v7 is a length of half wavelength of the radio wave.

The rotation shaft is attached to the center point of the array antenna on the substrate 227, here, the position of the midpoint between the reception antennas Rx3 and Rx4.

When the antenna panel 226 rotates by 360 degrees, as illustrated in FIG. 22B, a two-dimensional virtual array antenna is formed in which virtual antennas are disposed with a regular distance therebetween on the entire circumference of 360 degrees of six concentric circles with a distance of half wavelength therebetween.

(Sixth Modification)

FIG. 23A is a plan view of an example of an antenna panel 232 according to a sixth modification.

The antenna panel 232 includes a cross-shaped array antenna disposed on a substrate 233. FIGS. 23A and 23B illustrate a cross-shaped substrate 233, but the shape of the substrate 233 does not necessarily correspond to the shape of the array antenna. The cross-shaped array antenna includes four arms 232a, 232b, 232c, and 232d. The first arm 232a includes a transmission antenna Tx and five reception antennas Rx1, Rx2, Rx3, Rx4, and Rx5. The second arm 232b includes a transmission antenna Tx and five reception antennas Rx11, Rx12, Rx13, Rx14, and Rx15. The third arm 232c includes a transmission antenna Tx and five reception antennas Rx21, Rx22, Rx23, Rx24, and Rx25. The fourth arm 232d includes a transmission antenna Tx and five reception antennas Rx31, Rx32, Rx33, Rx34, and Rx35.

In each arm 232a to 232d, the five reception antennas are disposed outside the transmission antenna Tx. In each arm 232a to 232d, the transmission antenna Tx located at the center of the cross-shaped array antenna is common.

In each arm 232a to 232d, a distance between two adjacent antennas among the transmission antenna Tx and the five reception antennas Rx1 to Rx5 is a length of a wavelength of the radio wave. Therefore, in each arm 232a to 232d, when the reception signals of the five reception antennas are subjected to the synthetic aperture process, the reception signals are equivalent to the reception signals of the virtual antennas located at the midpoints of the transmission antenna Tx and the five reception antennas.

For example, in the first arm 232a, when the reception signals of the reception antennas Rx1 to Rx5 that receive the reflected wave of the transmission pulse irradiated from the transmission antenna Tx are subjected to the synthetic aperture process, the reception signals of the virtual antennas v1 to v5 are obtained.

The rotation shaft is attached to the center of the cross-shaped array antenna, that is, the position of the transmission antenna Tx.

When the antenna panel 232 rotates by 90 degrees, as illustrated in FIG. 23B, a two-dimensional virtual array antenna is formed in which virtual antennas are disposed with a regular distance therebetween on the entire circumference of 360 degrees of five concentric circles with a distance of half wavelength therebetween.

(Seventh Modification)

Figure 24A:
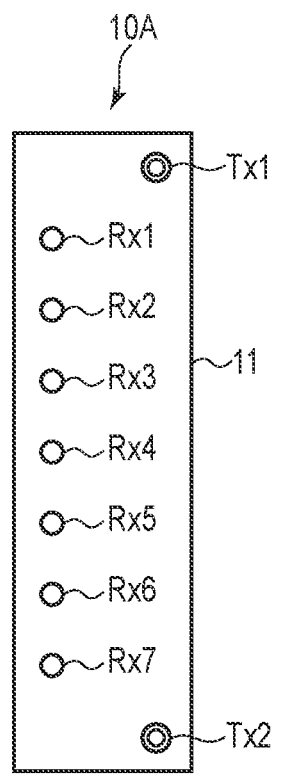
FIGS. 24A and 24B are plan views of an example of an antenna panel according to a seventh modification.
Figure 24B:
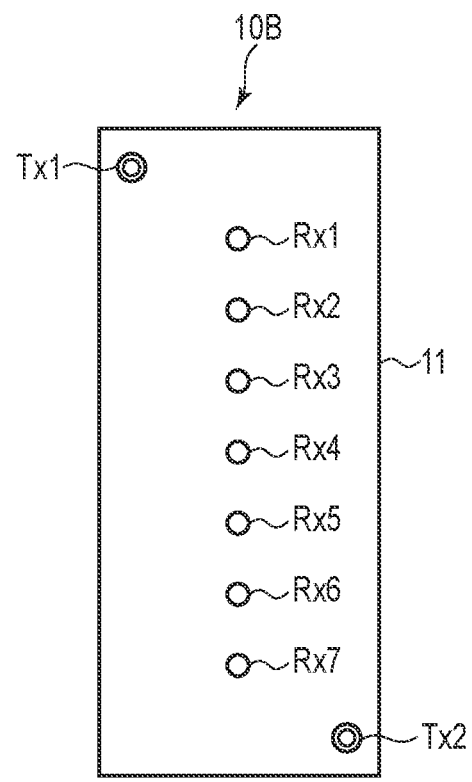

FIGS. 24A and 24B are plan views of an example of an antenna panel according to a seventh modification. In the first embodiment, the first transmission antenna Tx1, the reception antennas Rx1 to Rx7, and the transmission antennas Tx2 are disposed along a line on the substrate 11. In the seventh modification, the first transmission antenna Tx1, the reception antennas Rx1 to Rx7, and the transmission antennas Tx2 are disposed along a plurality of lines.

In an antenna panel 10A illustrated in FIG. 24A, a first line and a second line are defined on a substrate. The first line and the second line are parallel. The transmission antennas Tx1 and Tx2 are disposed along the first line, and the reception antennas Rx1 to Rx7 are disposed along the second line.

In an antenna panel 10B illustrated in FIG. 24B, a first line, a second line, and a third line are defined on the substrate. The first line and the second line are parallel, and the second line and the third line are parallel. The transmission antenna Tx1 is disposed on the first line, the reception antennas Rx1 to Rx7 are disposed along the second line, and the transmission antennas Tx2 is disposed on the third line.

In either case, the rotation shaft is fixed to the center of the reception array antenna, that is, the position of the reception antenna Rx4.

(Eighth Modification)

FIGS. 25A and 25B are plan views of another example of the antenna panel according to an eighth modification. In the antenna panel described above, the array antenna is disposed on a single substrate. In the eighth modification illustrated in FIGS. 25A and 25B, the transmission antenna Tx1, the reception antennas Rx1 to Rx7, and the transmission antennas Tx2 are disposed on different substrates.

In an antenna panel 10C illustrated in FIG. 25A, linear sub-substrates 11A, 11B are disposed on the substrate 11. The reception antennas Rx1 to Rx7 are disposed on the sub-substrate 11A, and the transmission antennas Tx1 and Tx2 are disposed on the sub-substrate 11B. The reception antennas Rx1 to Rx7 are disposed with an equal distance therebetween along a line. The transmission antennas Tx1 and Tx2 are disposed with an equal distance therebetween along a line. The line along which the reception antennas Rx1 to Rx7 are disposed is parallel to the line along which the transmission antennas Tx1 and Tx2 are disposed.

In an antenna panel 10D illustrated in FIG. 25B, a linear sub-substrate 11C, and square sub-substrates 11D and 11E are disposed on substrate 11. A first line, a second line, and a third line are defined on the substrate 11. The first line and the second line are parallel. The second line and the third line are parallel. The sub-substrate 11D is disposed on the first line, the sub-substrate 11C is disposed along the second line, and the sub-substrate 11E is disposed on the third line. The reception antennas Rx1 to Rx7 are disposed along a line on the sub-substrate 11C, the transmission antenna Tx1 is disposed on the sub-substrate 11D, and the transmission antennas Tx2 is disposed on the sub-substrate 11E. That is, the sub-substrate 11D on which the transmission antenna Tx1 is disposed and the sub-substrate 11E on which the transmission antennas Tx2 is disposed are disposed at different positions in the length direction at the opposite sides of the sub-substrate 11C on which the reception antennas Rx1 to Rx7 are disposed.

In either case, the rotation shaft is fixed to the center of the reception array antenna, that is, the position of the reception antenna Rx4.

It is also possible to further modify the above-described embodiments and modifications, and to combine the embodiments and modifications.

For example, the antenna panel may include a transmission antenna and a reception antenna instead of providing a plurality of reception antennas. In this case, the rotation shaft may be attached to the end or the central portion of the antenna panel.

In the antenna panel described above, the transmission antenna and the reception antenna may be interchanged. For example, the antenna panel of the first embodiment may include two reception antennas and seven transmission antennas.

Figure 26:
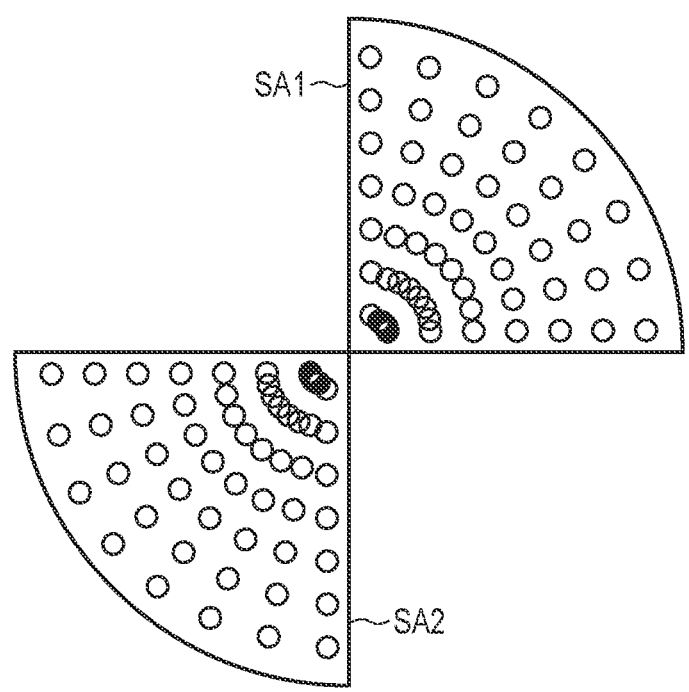
FIG. 26 illustrates another example of a two-dimensional virtual array antenna according to the first embodiment.

The shape of the synthetic aperture of the virtual array antenna is not limited to a circle. For example, the shape of the synthetic aperture of the virtual array antenna may be a semicircle or a fan shape. For example, when the antenna panel 20 of the second modification is rotated by 180 degrees, a virtual array antenna having a semicircular synthetic aperture is formed. When the antenna panel 20 of the second modification is rotated by 90 degrees, a virtual array antenna having a sectored synthetic aperture with a central angle of 90 degrees is formed. When the antenna panel 10 of the first embodiment is rotated by 90 degrees, as illustrated in FIG. 26, a virtual array antenna having two sectored synthetic apertures SA1 and SA2 with a center angle of 90 degrees is formed. The first sectored synthetic aperture SA1 is located in the angular range of 0 degrees to 90 degrees and the second sectored synthetic aperture SA2 is located in the angular range of 180 degrees to 270 degrees.

While certain embodiments have been described, these embodiments have been presented by way of example only, and are not intended to limit the scope of the inventions. Indeed, the novel embodiments described herein may be embodied in a variety of other forms; furthermore, various omissions, substitutions, and changes in the form of the embodiments described herein may be made without departing from the spirit of the inventions. The accompanying claims and their equivalents are intended to cover such forms or modifications as would fall within the scope and spirit of the inventions.

What is claimed is:

1. An antenna device comprising:
    an antenna panel including a first transmission antenna, a first reception antenna, and a second reception antenna; and
    a rotation device configured to rotate the antenna panel around a point on the antenna panel as a rotation center, wherein:
        a first radio wave is irradiated from the first transmission antenna when a rotation angle of the antenna panel is a first angle and a reflected radio wave of the first radio wave is received by the first reception antenna and the second reception antenna;
        a second radio wave is irradiated from the first transmission antenna when a rotation angle of the antenna panel is a second angle different from the first angle and a reflected radio wave of the second radio wave is received by the first reception antenna and the second reception antenna; and
        a distance from the rotation center to the first transmission antenna is longer than any of distances from the rotation center to the first and the second reception antennas.

2. The antenna device according to claim 1, wherein the first transmission antenna, the first reception antenna, and the second reception antenna are linearly disposed on the antenna panel.

3. The antenna device according to claim 1, wherein a distance between adjacent antennas on the antenna panel is equal to a length of a wavelength of the first radio wave or the second radio wave.

4. The antenna device according to claim 1, further comprising an electronic circuit configured to process reception signals of the first reception antenna and the second reception antenna to output information on an object reflecting the first radio wave and the second radio wave.

5. An antenna device comprising:
    an antenna panel including a first transmission antenna, a first reception antenna, and a second reception antenna; and
    a rotation device configured to rotate the antenna panel around a point on the antenna panel as a rotation center, wherein:
        a first radio wave is irradiated from the first transmission antenna when a rotation angle of the antenna panel is a first angle and a reflected radio wave of the first radio wave is received by the first reception antenna and the second reception antenna;
        a second radio wave is irradiated from the first transmission antenna when a rotation angle of the antenna panel is a second angle different from the first angle and a reflected radio wave of the second radio wave is received by the first reception antenna and the second reception antenna; and
        a distance from the rotation center to the first transmission antenna is shorter than any of distances from the rotation center to the first and the second reception antennas.

6. The antenna device according to claim 5, wherein the first transmission antenna, the first reception antenna, and the second reception antenna are linearly disposed on the antenna panel.

7. The antenna device according to claim 5, wherein a distance between adjacent antennas on the antenna panel is equal to a length of a wavelength of the first radio wave or the second radio wave.

8. The antenna device according to claim 5, further comprising an electronic circuit configured to process reception signals of the first reception antenna and the second reception antenna to output information on an object reflecting the first radio wave and the second radio wave.

9. An antenna device comprising:
    an antenna panel including a first transmission antenna, a first reception antenna, and a second reception antenna; and a rotation device configured to rotate the antenna panel around a point on the antenna panel as a rotation center wherein:
a first radio wave is irradiated from the first transmission antenna when a rotation angle of the antenna panel is a first angle and a reflected radio wave of the first radio wave is received by the first reception antenna and the second reception antenna;
a second radio wave is irradiated from the first transmission antenna when a rotation angle of the antenna panel is a second angle different from the first angle and a reflected radio wave of the second radio wave is received by the first reception antenna and the second reception antenna;
the antenna panel further includes a third reception antenna and a fourth reception antenna;
the first transmission antenna, the first, the second, the third, and the fourth reception antennas are disposed in a cross shape having four arms;
a distance from the rotation center to the first transmission antenna is shorter than any of distances from the rotation center to the first, the second, the third, and the fourth reception antennas; and
at least one reception antenna is disposed on each of the four arms.

10. The antenna device according to claim 9, wherein the first transmission antenna, the first reception antenna, and the second reception antenna are linearly disposed on the antenna panel.

11. The antenna device according to claim 9, wherein a distance between adjacent antennas on the antenna panel is equal to a length of a wavelength of the first radio wave or the second radio wave.

12. The antenna device according to claim 9, further comprising an electronic circuit configured to process reception signals of the first reception antenna and the second reception antenna to output information on an object reflecting the first radio wave and the second radio wave.

13. An antenna device comprising:
an antenna panel including a first transmission antenna, a first reception antenna, and a second reception antenna; and
a rotation device configured to rotate the antenna panel around a point on the antenna panel as a rotation center, wherein:
a first radio wave is irradiated from the first transmission antenna when a rotation angle of the antenna panel is a first angle and a reflected radio wave of the first radio wave is received by the first reception antenna and the second reception antenna;
a second radio wave is irradiated from the first transmission antenna when a rotation angle of the antenna panel is a second angle different from the first angle and a reflected radio wave of the second radio wave is received by the first reception antenna and the second reception antenna;
the antenna panel further includes a second transmission antenna;
a third radio wave is irradiated from the second transmission antenna when a rotation angle of the antenna panel is the first angle, and a reflected radio wave of the third radio wave is received by the first reception antenna and the second reception antenna;
a fourth radio wave is irradiated from the second transmission antenna when a rotation angle of the antenna panel is the second angle, and a reflected radio wave of the fourth radio wave is received by the first reception antenna and the second reception antenna; and
a distance from the rotation center to the first transmission antenna and a distance from the rotation center to the second transmission antenna are longer than any of distances from the rotation center to the first and the second reception antennas.

14. The antenna device according to claim 13, wherein the first transmission antenna, the first reception antenna, and the second reception antenna are linearly disposed on the antenna panel.

15. The antenna device according to claim 13, wherein a distance between adjacent antennas on the antenna panel is equal to a length of a wavelength of the first radio wave or the second radio wave.

16. The antenna device according to claim 13, further comprising an electronic circuit configured to process reception signals of the first reception antenna and the second reception antenna to output information on an object reflecting the first radio wave and the second radio wave.

17. An antenna device comprising:
an antenna panel including a first transmission antenna, a first reception antenna, and a second reception antenna; and
a rotation device configured to rotate the antenna panel around a point on the antenna panel as a rotation center, wherein:
a first radio wave is irradiated from the first transmission antenna when a rotation angle of the antenna panel is a first angle and a reflected radio wave of the first radio wave is received by the first reception antenna and the second reception antenna;
a second radio wave is irradiated from the first transmission antenna when a rotation angle of the antenna panel is a second angle different from the first angle and a reflected radio wave of the second radio wave is received by the first reception antenna and the second reception antenna;
the antenna panel further includes a second transmission antenna;
a third radio wave is irradiated from the second transmission antenna when a rotation angle of the antenna panel is the first angle, and a reflected radio wave of the third radio wave is received by the first reception antenna and the second reception antenna;
a fourth radio wave is irradiated from the second transmission antenna when a rotation angle of the antenna panel is the second angle, and a reflected radio wave of the fourth radio wave is received by the first reception antenna and the second reception antenna; and
a distance from the rotation center to the first transmission antenna and a distance from the rotation center to the second transmission antenna are shorter than any of distances from the rotation center to the first and the second reception antennas.

18. The antenna device according to claim 17, wherein the first transmission antenna, the first reception antenna, and the second reception antenna are linearly disposed on the antenna panel.

19. The antenna device according to claim 17, wherein a distance between adjacent antennas on the antenna panel is equal to a length of a wavelength of the first radio wave or the second radio wave.

20. The antenna device according to claim 17, further comprising an electronic circuit configured to process reception signals of the first reception antenna and the second reception antenna to output information on an object reflecting the first radio wave and the second radio wave.

21. An antenna device comprising:
an antenna panel including a first transmission antenna, a first reception antenna, and a second reception antenna; and
a rotation device configured to rotate the antenna panel around a point on the antenna panel as a rotation center, wherein:
a first radio wave is irradiated from the first transmission antenna when a rotation angle of the antenna panel is a first angle and a reflected radio wave of the first radio wave is received by the first reception antenna and the second reception antenna;
a second radio wave is irradiated from the first transmission antenna when a rotation angle of the antenna panel is a second angle different from the first angle and a reflected radio wave of the second radio wave is received by the first reception antenna and the second reception antenna;
the antenna panel further includes a second transmission antenna;
a third radio wave is irradiated from the second transmission antenna when a rotation angle of the antenna panel is the first angle, and a reflected radio wave of the third radio wave is received by the first reception antenna and the second reception antenna;
a fourth radio wave is irradiated from the second transmission antenna when a rotation angle of the antenna panel is the second angle, and a reflected radio wave of the fourth radio wave is received by the first reception antenna and the second reception antenna;
the antenna panel further includes a third reception antenna and a fourth reception antenna;
the first transmission antenna, the second transmission antenna, the first, the second, the third, and the fourth reception antennas are disposed in a cross shape having four arms;
a distance from the rotation center to the first transmission antenna or a distance from the rotation center to the second transmission antenna is shorter than any of distances from the rotation center to the first, the second, the third, and the fourth reception antennas; and
at least one reception antenna is disposed on each of the four arms.

22. The antenna device according to claim 21, wherein the first transmission antenna, the first reception antenna, and the second reception antenna are linearly disposed on the antenna panel.

23. The antenna device according to claim 21, wherein a distance between adjacent antennas on the antenna panel is equal to a length of a wavelength of the first radio wave or the second radio wave.

24. The antenna device according to claim 21, further comprising an electronic circuit configured to process reception signals of the first reception antenna and the second reception antenna to output information on an object reflecting the first radio wave and the second radio wave.

25. An antenna device comprising:
an antenna panel including a first transmission antenna, a first reception antenna, and a second reception antenna; and
a rotation device configured to rotate the antenna panel around a point on the antenna panel as a rotation center, wherein:
a first radio wave is irradiated from the first transmission antenna when a rotation angle of the antenna panel is a first angle and a reflected radio wave of the first radio wave is received by the first reception antenna and the second reception antenna;
a second radio wave is irradiated from the first transmission antenna when a rotation angle of the antenna panel is a second angle different from the first angle and a reflected radio wave of the second radio wave is received by the first reception antenna and the second reception antenna;
the antenna panel further includes a second transmission antenna;
a third radio wave is irradiated from the second transmission antenna when a rotation angle of the antenna panel is the first angle, and a reflected radio wave of the third radio wave is received by the first reception antenna and the second reception antenna;
a fourth radio wave is irradiated from the second transmission antenna when a rotation angle of the antenna panel is the second angle, and a reflected radio wave of the fourth radio wave is received by the first reception antenna and the second reception antenna;
the antenna panel further includes a third reception antenna;
the first transmission antenna, the second transmission antenna, the first, the second, and the third reception antennas are disposed in a Y shape having three arms;
a distance from the rotation center to the first transmission antenna or a distance from the rotation center to the second transmission antenna is shorter than any of distances from the rotation center to the first, the second, and the third reception antennas; and
at least one reception antenna is disposed on each of the three arms.

26. The antenna device according to claim 25, wherein the first transmission antenna, the first reception antenna, and the second reception antenna are linearly disposed on the antenna panel.

27. The antenna device according to claim 25, wherein a distance between adjacent antennas on the antenna panel is equal to a length of a wavelength of the first radio wave or the second radio wave.

28. The antenna device according to claim 25, further comprising an electronic circuit configured to process reception signals of the first reception antenna and the second reception antenna to output information on an object reflecting the first radio wave and the second radio wave.

29. A system comprising:
a reception device configured to:
receive a reflected radio wave of a first radio wave when a rotation angle of an antenna panel including a transmission antenna and a first reception antenna and a second reception antenna is a first angle, the rotation angle being an angle around a point on the antenna panel as a rotation center, the first radio wave being irradiated from the transmission antenna, reflected by an object, and received by the first reception antenna and the second reception antenna, and
receive a reflected radio wave of a second radio wave, when a rotation angle of the antenna panel is a second angle, the second radio wave being irradiated from the transmission antenna, reflected by an object, and received by the first reception antenna and the second reception antenna; and an output device configured to output information about the object, wherein a distance from the rotation center to the transmission antenna is longer than any of distances from the rotation center to the first and the second reception antennas.

30. A transmission/reception method comprising:

receiving a reflected radio wave of a first radio wave when a rotation angle of an antenna panel including a transmission antenna and a first reception antenna and a second reception antenna is a first angle, the rotation angle being an angle around a point on the antenna panel as a rotation center, the first radio wave being irradiated from the transmission antenna, reflected by an object, and received by the first reception antenna and the second reception antenna;

receiving a reflected radio wave of a second radio wave, when a rotation angle of the antenna panel is a second angle, the second radio wave being irradiated from the transmission antenna, reflected by an object, and received by the first reception antenna and the second reception antenna; and outputting information about the object, wherein a distance from the rotation center to the transmission antenna is longer than any of distances from the rotation center to the first and the second reception antennas.

31. A system comprising:

a reception device configured to:
  receive a reflected radio wave of a first radio wave when a rotation angle of an antenna panel including a transmission antenna and a first reception antenna and a second reception antenna is a first angle, the rotation angle being an angle around a point on the antenna panel as a rotation center, the first radio wave being irradiated from the transmission antenna, reflected by an object, and
  received by the first reception antenna and the second reception antenna, and receive a reflected radio wave of a second radio wave, when a rotation angle of the antenna panel is a second angle, the second radio wave being irradiated from the transmission antenna, reflected by an object, and received by the first reception antenna and the second reception antenna; and an output device configured to output information about the object, wherein a distance from the rotation center to the transmission antenna is shorter than any of distances from the rotation center to the first and the second reception antennas.

32. A transmission/reception method comprising:

receiving a reflected radio wave of a first radio wave when a rotation angle of an antenna panel including a transmission antenna and a first reception antenna and a second reception antenna is a first angle, the rotation angle being an angle around a point on the antenna panel as a rotation center, the first radio wave being irradiated from the transmission antenna, reflected by an object, and received by the first reception antenna and the second reception antenna;

receiving a reflected radio wave of a second radio wave, when a rotation angle of the antenna panel is a second angle, the second radio wave being irradiated from the transmission antenna, reflected by an object, and received by the first reception antenna and the second reception antenna; and outputting information about the object, wherein a distance from the rotation center to the transmission antenna is shorter than any of distances from the rotation center to the first and the second reception antennas.

* * * * *